US012560942B2

(12) United States Patent
Wahren et al.

(10) Patent No.: US 12,560,942 B2

(45) Date of Patent: Feb. 24, 2026

(54) THRUST VECTORING FOR FLUID BORNE VEHICLES

(71) Applicant: Autonomous Devices Limited, Milton Keynes (GB)

(72) Inventors: Ken Wahren, Buckingham (GB); Oliver Henry Haanen, London (GB); Michael Alexander Snook, Sharnbrook (GB)

(73) Assignee: Autonomous Devices Limited, Milton Keynes (GB)

( * ) Notice: Subject to any disclaimer, the term of this patent is extended or adjusted under 35 U.S.C. 154(b) by 0 days.

(21) Appl. No.: 17/611,441

(22) PCT Filed: May 18, 2020

(86) PCT No.: PCT/GB2020/051211
§ 371 (c)(1),
(2) Date: Nov. 15, 2021

(87) PCT Pub. No.: WO2020/229847
PCT Pub. Date: Nov. 19, 2020

(65) Prior Publication Data
US 2022/0236746 A1     Jul. 28, 2022

(30) Foreign Application Priority Data
May 16, 2019    (GB) ...................................... 1906950

(51) Int. Cl.
*G05D 1/00*       (2024.01)
*B64C 27/52*      (2006.01)
(Continued)

(52) U.S. Cl.
CPC ........... *G05D 1/0841* (2013.01); *B64C 27/52* (2013.01); *B64U 10/16* (2023.01); *B64U 30/296* (2023.01);
(Continued)

(58) Field of Classification Search
None
See application file for complete search history.

(56) References Cited

U.S. PATENT DOCUMENTS 10,351,234 B1 *   7/2019   Dennis .................... B64C 13/12
2016/0325829 A1   11/2016   Ahn et al.
(Continued)

FOREIGN PATENT DOCUMENTS

CN     103274042 A    9/2013
CN     104443343 A    3/2015
(Continued)

OTHER PUBLICATIONS

European Patent Office, PCT International Search Report issued for PCT/GB2020/051211, 4 pgs., date of mailing: Oct. 28, 2021.
(Continued)

*Primary Examiner* — Jelani A Smith
*Assistant Examiner* — Davin Seol
(74) *Attorney, Agent, or Firm* — Banner & Witcoff, Ltd.

(57) ABSTRACT

Example implementations provide fluid-borne vehicles comprising a body and a plurality of thrust vectoring modules, each thrust vectoring module comprising a set of thrust producing means, wherein a first thrust producing means, mounted on a first mounting bar having a first mounting bar axis, is rotatable about the mounting bar axis and the mounting bar axis is rotatable about an arm having an arm axis that is nonparallel to the mounting bar axis; and a second thrust producing means, mounted on a second mounting bar having a second mounting bar axis, is rotatable about the second mounting bar axis and the second mounting bar axis is rotatable about the arm axis that is nonparallel to the second mounting bar axis.

23 Claims, 19 Drawing Sheets

(51) Int. Cl.

| | |
|---|---|
| *B64U 10/16* | (2023.01) |
| *B64U 30/296* | (2023.01) |
| *B64U 50/14* | (2023.01) |
| *B64U 50/19* | (2023.01) |
| *B64U 101/15* | (2023.01) |

(52) U.S. Cl.
CPC ............. *G05D 1/101* (2013.01); *B64U 50/14* (2023.01); *B64U 50/19* (2023.01); *B64U 2101/15* (2023.01); *B64U 2201/10* (2023.01)

(56) References Cited

U.S. PATENT DOCUMENTS

| | | | |
|---|---|---|---|
| 2016/0347443 A1 | 12/2016 | Lee | |
| 2017/0015412 A1* | 1/2017 | Matus | .................. G05D 1/0808 |
| 2018/0148169 A1* | 5/2018 | Zhang | ................ B64C 29/0033 |
| 2021/0261252 A1* | 8/2021 | Dayan | ................. B64C 29/0033 |
| 2022/0001976 A1* | 1/2022 | Iñaki | ....................... B64C 27/08 |
| 2022/0048617 A1* | 2/2022 | Shima | ................... B64U 50/14 |

FOREIGN PATENT DOCUMENTS

| | | |
|---|---|---|
| CN | 107757912 A | 3/2018 |
| CN | 108482633 A | 9/2018 |
| KR | 2016/0031602 A | 3/2016 |
| WO | 2017/184095 A1 | 10/2017 |
| WO | 2018/106137 A2 | 6/2018 |

OTHER PUBLICATIONS

GB Intellectual Property Office, Search Report issued for GB 1906950.9, 4 pgs., date of mailing: Apr. 23, 2020.

* cited by examiner

100

200

300

400

500

600

UP

1000

1200

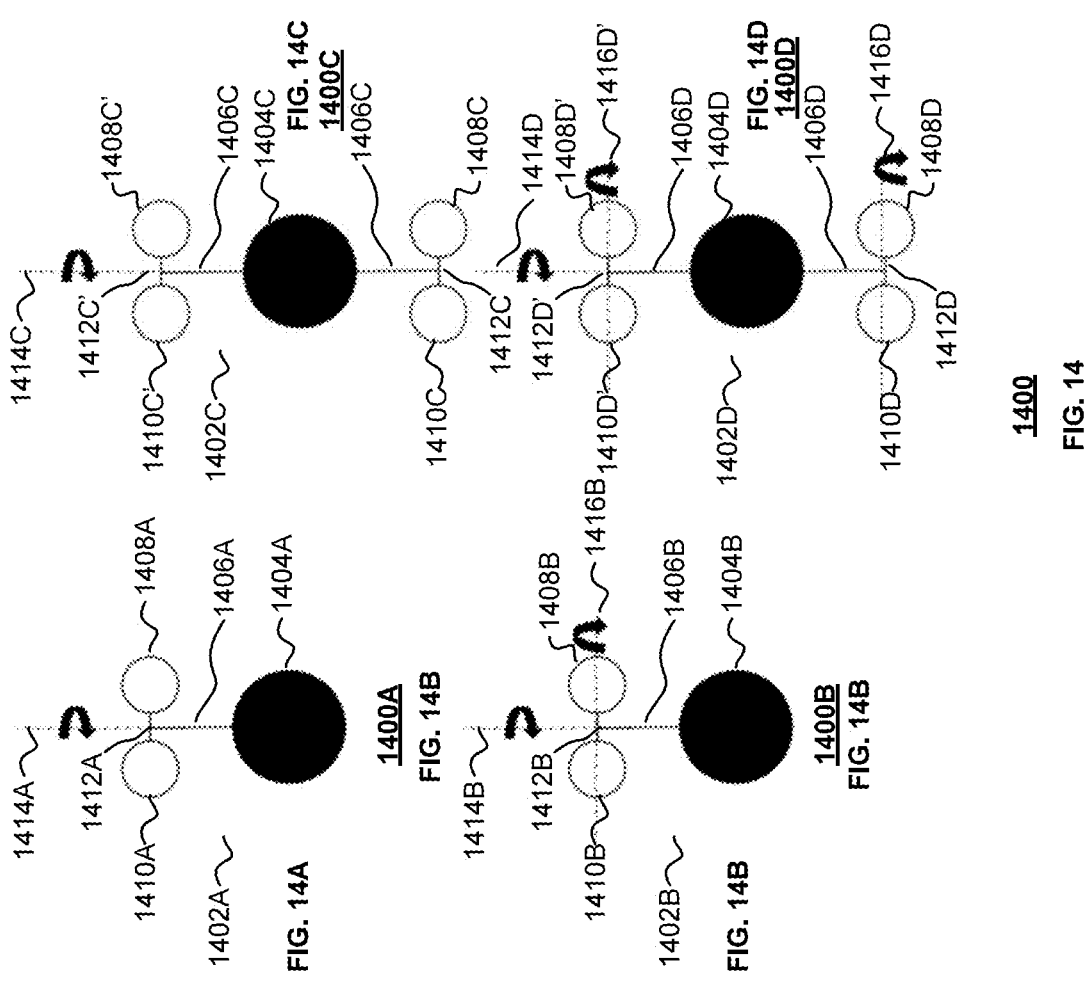
FIG. 14A    1400A    FIG. 14B
FIG. 14B    1400B    FIG. 14B
FIG. 14C    1400C    FIG. 14C
FIG. 14D    1400D    FIG. 14D
1400    FIG. 14

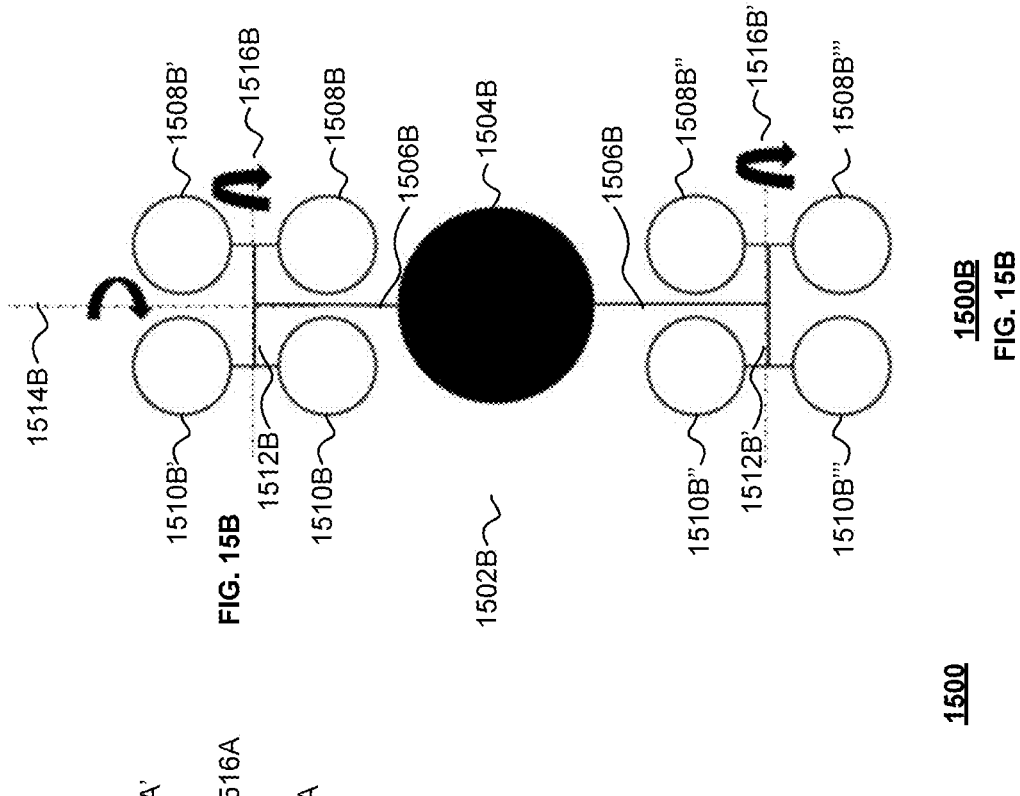
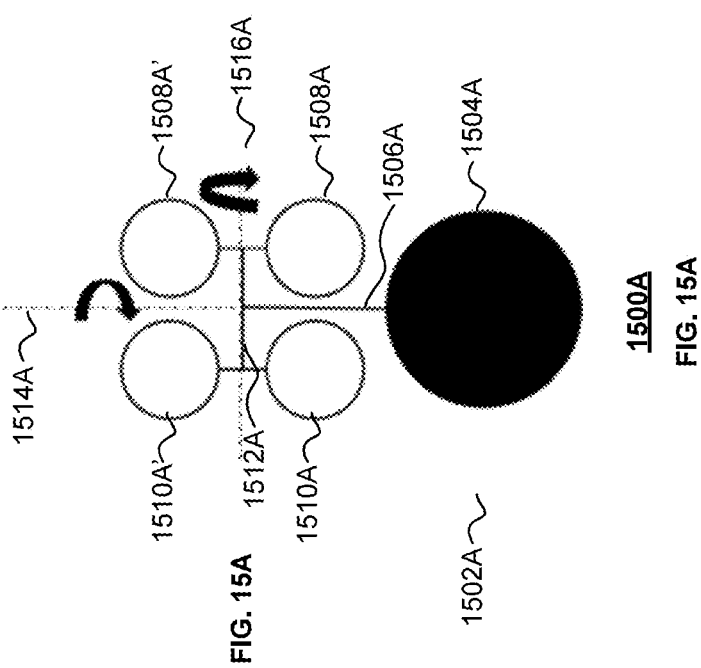

1600

1700

1800

1900

THRUST VECTORING FOR FLUID BORNE VEHICLES

TECHNICAL FIELD

The present application relates to thrust vectoring for fluid borne vehicles such as, for example, vehicles that use thrust vectoring to enable them to change their angular and/or linear velocities rapidly, and to decouple their trajectory from their body orientation. The present application is particularly relevant to aircraft, more particularly unmanned aerial vehicles ("UAVs"), unmanned submersible vehicle, remotely operated vehicles or drones.

BACKGROUND

A number of powered, fluid borne vehicles are known, including vehicles adapted to operate under the control of an onboard human pilot, as well as vehicles adapted to operate unmanned (being controlled either by an offboard human pilot, by onboard software, by offboard software, or by some combination of the above). Some such vehicles impart forces on the fluid medium through thrust producing means such as propellers and fans (also known as rotors), which accelerate the medium as they are rotated relative to the host vehicle by a driving means such as an electric motor or internal combustion engine. Examples of this type of vehicle include rotary wing and propeller driven fixed wing aircraft, submersibles (including submarines and underwater remotely operated vehicles ("ROVs")) and airships. Other vehicles comprise thrust producing means wherein stored reaction matter is accelerated and ejected from the vehicle (for example, by burning a stored fuel and a stored oxidant, as in the case of rocket propelled vehicles). Further vehicles combine elements of these thrust producing means (for example, jet engine propelled vehicles, which burn stored fuel but predominantly accelerate ambient air ingested by the engines). Further to producing thrust, some thrust producing means also produce a moment (or torque) on the vehicle, and in many cases the production of thrust and the production of torque depend on each other.

Most powered, fluid borne vehicles control the forces and moments generated by their thrust producing means in order to control their motion through the fluid, using the thrust producing means directly to resist (or assist) gravity and/or to produce control forces and moments, or to ensure adequate relative flow of fluid about fluid dynamic surfaces affixed to the vehicle (for example, foils, wings or fins). A vehicle with prominent fluid dynamic surfaces typically generates large forces normal to these surfaces whilst largely controlling its orientation and trajectory by non-thrust producing means (for example, by actuating control surfaces such as flaps, ailerons or spoilers to influence the normal force on each fluid dynamic surface).

Powered, fluid-borne vehicles that rely heavily on direct control of the thrust producing means in order to generate control forces and moments may implement thrust vectoring, whereby both the orientations and the magnitudes of forces and moments produced by each thrust producing means are controlled by a vehicle control system, in order to directly produce a net force and moment on the vehicle and hence control its trajectory.

One example of such a fluid borne vehicle is the multi-rotor drone, a vehicle comprising a plurality of rotors typically arranged such that their axes of rotation are all substantially parallel to each other and said axes are in a substantially fixed relation to the vehicle. Such a vehicle vectors the forces and moments generated by the rotors by varying the speed of rotation of each rotor independently (causing a change in the thrust and moment applied to the vehicle by each rotor). By so varying the force and moment applied to the vehicle by each rotor, the vehicle changes its orientation, thereby changing the direction in which the net thrust from the rotors acts, and so controls its trajectory.

A disadvantage of a vehicle such as the multi-rotor drone described above is that the orientation of the vehicle (and any payloads affixed directly to the vehicle, such as sensors or effectors) is coupled to the vehicle's trajectory, which is undesirable when a payload needs to be aimed dynamically. A common solution that at least partially decouples the orientation of a payload item from the orientation (and trajectory) of the vehicle is the introduction of a motorised gimbal between the vehicle and the payload. However, such a gimbal adds weight, and cannot typically compensate for the complete range of vehicle orientations due to body masking and mechanical constraints on gimbal rotation. As a result, significant performance and agility can be sacrificed, especially when the payload is elongate (for example, a tube-shaped projectile launcher) or otherwise of a high mass and inertia (necessitating a heavy gimbal). This significantly degrades the mission capability of such vehicles in tasks requiring high agility and performance whilst simultaneously aiming payloads independently of the vehicle's trajectory.

A further consequence of the coupling between the vehicle's orientation and the net force vector is that the inertia of the entire vehicle affects the speed with which the vehicle can modify said vector. Typically, a multi-rotor drone comprises significant structural mass, as well as the mass of batteries and onboard systems required for flight. The inertia of this combined mass impedes the ability of the control system to quickly modify the net force vector, for example to counter external disturbances such as wind gusts. This hampers the ability of such a vehicle to operate in windy environments.

A further disadvantage of the coupling between the vehicle's orientation and the net force vector with respect to multi-rotor drones is that, in order to move horizontally, a drone will typically adopt a high drag configuration relative to its direction of motion, reducing its ability to achieve a high speed.

Rotating the axis of rotation of each rotor of a multi-rotor drone (each about an axis radiating substantially from the centre of the drone and passing close to the axis of rotation of the rotor) is a known method of decoupling such a vehicle's trajectory from its orientation, and also of potentially improving the speed of response to disturbances (see Kamel, M., Verling, S., Elkhatib, O., Sprecher, C., Wulkop, P., Taylor, Z., Siegwart, R. and Gilitschenski, I., 2018. Voliro: An omnidirectional hexacopter with tiltable rotors. arXiv preprint arXiv:1801.04581).

In this approach, however, it is difficult to efficiently apply large forces in any configuration apart from the configuration in which all the rotor axes of rotation are substantially parallel (as for a conventional multi-rotor drone). Accordingly, decoupling of the vehicle's trajectory and orientation still incurs a significant cost in performance and agility.

BRIEF DESCRIPTION OF THE DRAWINGS

Example implementations will now be described, by way of example only, referring to the accompany drawings.

FIG. 14 is a diagram showing plan views of thrust vectoring modules according to example implementations.

FIG. 15 is a diagram showing plan views of further thrust vectoring modules according to example implementations.

DETAILED DESCRIPTION

Figure 1:
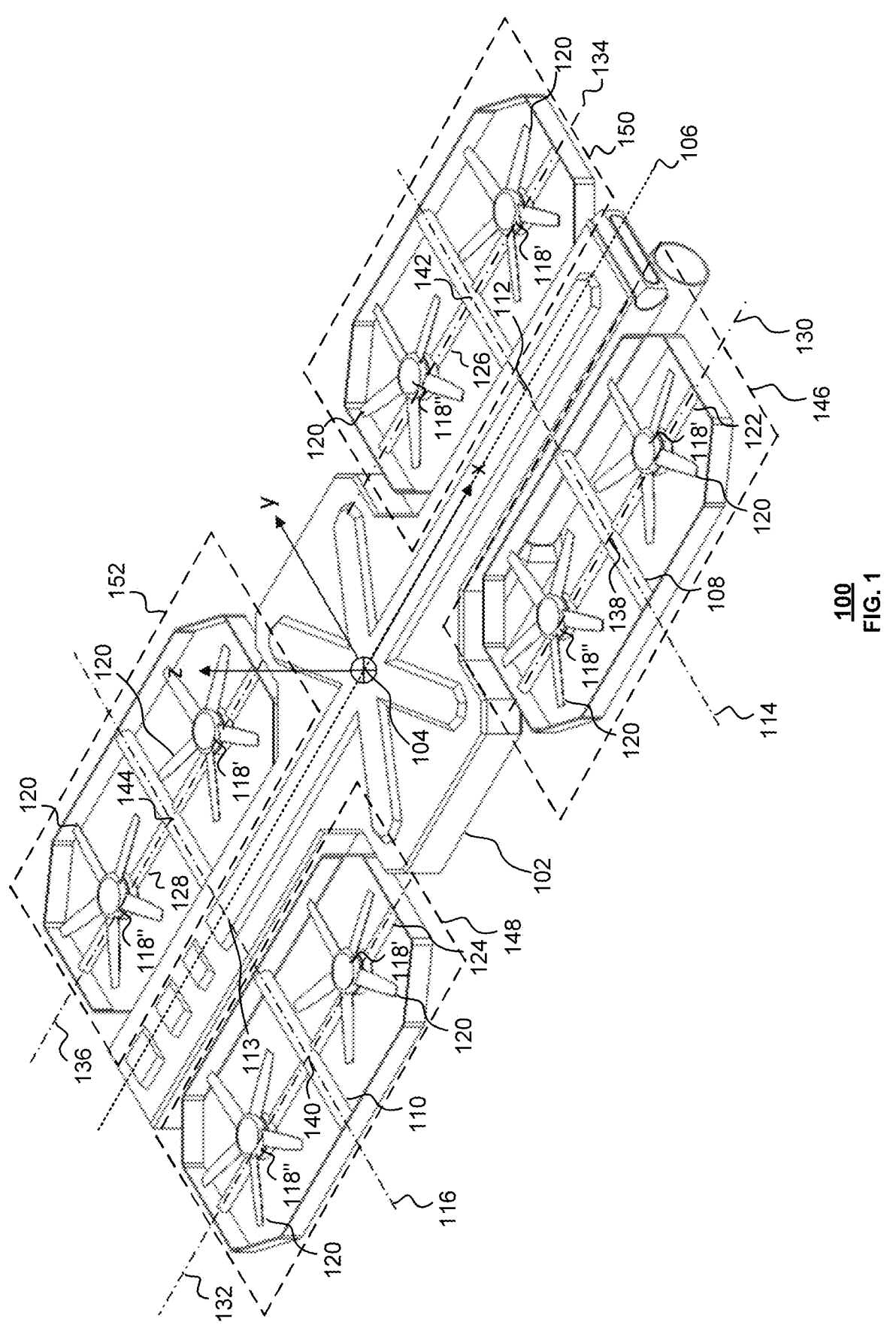
FIG. 1 is a perspective view of an unmanned aerial vehicle according to example implementations.

Referring to FIG. 1, shown is an example implementation of an unmanned aerial vehicle 100. The vehicle 100 is shown with axes 'x', 'y', and 'z' that will be used in the forthcoming description. The vehicle 100 has a vehicle body 102 that extends generally along the 'x' axis and has a centre of gravity (COG) 104. The vehicle 100 has a longitudinal axis 106.

The vehicle 100 has two arms 108, 110 rotatably attached to the vehicle body 102 at a distance along the 'x' axis from the COG 104 at arm mounting points 112, 113. The two arms 108, 110 are each able to rotate relative to the vehicle body 102 about respective axes of rotation 114, 116. The rotation of the arms 108, 110 may be limited, or the arms may be able to rotate continuously, that is, freely without any rotational limit. The rotation of one or both arms 108, 110 may be controlled by respective independent actuators that are described below with reference to FIG. 9. Additionally, or alternatively, one arm, or both of the arms 108, 110, may be free to rotate in a bearing with the rotation being controlled by controlling the moments acting on an arm due to at least one of one or more forces or one or more moments from thrust producing means 118', 118". It will be appreciated that such one or more moments will have an effect when one or more than one of the bars 122 to 128 are rotated. The mounting point 112 of one arm is located a distance from the vehicle COG along the 'x' axis in one direction while the mounting point 113 of the other arm is located a distance from the vehicle COG along the 'x' axis in the opposite direction.

Example implementations can be realised in which the thrust producing means comprises one or more than one of a thruster such as, for example, a rotor such as any of the propellers 120 depicted. The thrust producing means may additionally comprise one or more than one motor. A motor can be provided per rotor.

Each arm 108, 110 has rotatably attached thereto a pair of thrust producing means mounting bars 122 to 128. In the example implementation shown, the mounting bars 122 to 128 are rotatable relative to their respective arms 108, 110 about respective mounting bar axes 130 to 136 of rotation. The mounting bars 122 to 128 to are each mounted at mounting points 138 to 144 along the arms 108, 110. The mounting points 138 to 144 are displaced a distance along the respective arm rotation axes 114, 116 from the arm mounting point 112, 113 of their respective arms 108, 110. For each arm 108, 110, one mounting bar is displaced a distance along the arm rotation axis in one direction and the other in the opposite direction. The rotation of each bar about a respective rotational axis 130 to 136 may be controlled by an appropriate actuator including through the use of one or more further (not shown) thrust producing means.

Each of the mounting bars 122 to 128 has attached thereto one or more thrust producing means 118', 118". Example implementations will be described in which each mounting bar 122 to 128 has an equal number of thrust producing means. Furthermore, example implementations will be described in which each mounting bar 122 to 128 comprises respective pluralities of thrust producing means 118', 118" such as, for example, the respective pairs of thrust producing means 118', 118" depicted. The thrust producing means 118', 118" are each mounted a distance from respective bar mounting points 138 to 144 along respective axes of rotation 130 to 136. Example implementations can be realised in which one, or a first, thrust producing means 118' of each bar is displaced from a respective bar mounting point along a respective mounting bar axis of rotation in one direction and the other thrust producing means 118" is displaced in the opposite direction.

A thrust vectoring module 146 to 152 comprises a set of arms, set of thrust producing means mounting bars, and a set of thrust producing means. It will be appreciated from the above description that each thrust vectoring module 146 to 152 can be rotated about an axis parallel to the vehicle body 'y' axis by rotating the arm 108, 110 of said thrust vectoring module about its rotational axis. Furthermore, each thrust producing means 118', 118" can be rotated about an axis not parallel to a respective arm rotational axis 114, 116 by rotating the corresponding thrust producing means mounting bar 112 to 128 about a respective rotational axis 130 to 136. A thrust vectoring module 146 to 152 is an example implementation of a thrust vectoring assembly. As will be appreciated below, particularly with reference to FIG. 12, a thrust vectoring module can comprise at least one thrust producing means mounted on a respective bar rotatably coupled to a respective arm.

The vehicle 100 is shown in FIG. 1 in a hovering position with the body 102 of the vehicle in a horizontal position. In this position, the vehicle 100 can be rotated and stabilised about the body 'x' axis by differing the thrust provided by each thrust producing means 118', 118".

The vehicle 100 can be rotated and stabilised about the body 'y' axis by differing the forces produced by the two arms 108, 110 about this axis. With the arms 108, 110 in the positions shown in FIG. 1, the vehicle 100 can thus be rotated and stabilised about the body 'y' axis by differing the net forces produced by thrust producing means 118', 118" of the rear thrust vectoring modules 148 and 152 relative to that produced by thrust producing means associated with the front thrust vectoring modules 146 and 150.

Figure 4:
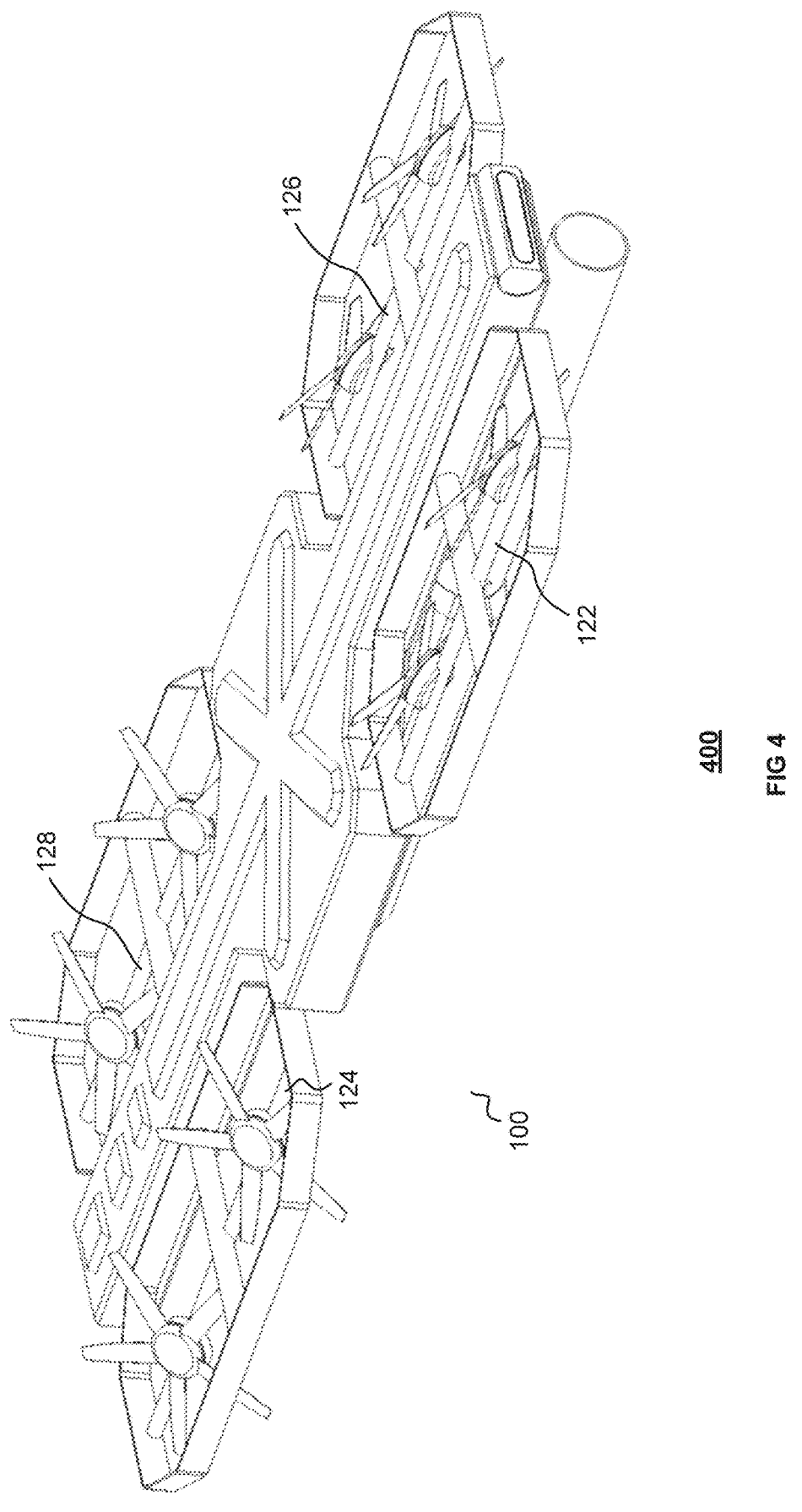
FIG. 4 is a perspective view of the vehicle with its thrust vectoring modules configured to yaw the vehicle according to example implementations.

The vehicle can be rotated and stabilised about the body 'z' axis by rotating one or more of the mounting bars 122 to 128 mounted on, or at the ends of, each arm 108, 110 into positions in which the forces produced from the thrust producing means 118', 118" mounted on, or at the ends of, each bar have a component perpendicular to the body 'z' axis. Such an arrangement is shown in FIG. 4, where all four mounting bars 122 to 128 shown have been rotated so that the forces produced from the thrust producing means 118', 118" attached thereto create moments about the body 'z' axis. It will be appreciated that it is not necessary to rotate all the mounting bars 122 to 128 to control the vehicle 100 about the body 'z' axis. It will be appreciated that the vehicle can alternatively be rotated and stabilised about the body 'z' axis through applying a torque differential to counter rotating pairs of rotors of a rotary thrust producing means 118', 118" in arrangements using rotary thrust producing means 118', 118". The thrust vectoring approach described herein may provide faster response times and/or larger moments.

In the example implementations described herein the thrust producing means can be controlled individually and independently of one another in any and all permutations. The control of the thrust producing means comprises control over at least one or more than one of the speed of the rotors 120, the rotation of at least one arm or both of the arms 108, 110, or at least one or more than one of rotation of the mounting bars 122 to 128, all taken jointly and severally in any and all permutations. Similarly, rotations of an arm 108, 110 can be individually and independently controlled. Also, rotations of the mounting bars 122 to 128 can be individually and independently controlled. Still further, example implementations can be realised in which the rotors 120 have at least one, or both, of cyclic or collective pitch control that can all be controlled individually and independently. Still further any and all example implementations can be realised in which the thrust producing means 118', 118" can be formed into one or more than one set of thrust producing means 118', 118" such that the thrust producing means 118',

118" within a set can be controlled individually and independently of any other thrust producing means outside of the set, and/or in which the thrust producing means within a set can be controlled synchronously with one another. For example, the thrust producing means within a set can all be controlled to vary respective thrusts by a given percentage, or to adopt a prescribed thrust.

In example implementations herein the two arms 108, 110 are free to rotate relative to the vehicle body 102 as a result of the moments acting about their respective rotational axes 114, 116. In such an embodiment, the rotation of each arm 108, 110 relative to the vehicle body 102 must be controlled. This can be achieved by differing or otherwise varying the net thrust provided by the thrust producing means 118', 118" mounted on opposing ends of the mounting bars such as, for example, ensuring that thrust producing means 118' on the end of mounting bar 122 has a different thrust to thrust producing means 118" on the other end of the mounting bar 112. It will be appreciated that by having such a thrust differential between opposing thrust producing means pairs, at least one, or both, of the rotational position or angular rates of rotation of the arms 108, 110 relative to the body 100 can be controlled.

It will be appreciated that by rotating the arms 108, 110 to a desired angle relative to the vehicle body 102, the force/moment vector produced from the thrust producing means 118', 118" associated with each arm can be rotated about an axis parallel to the vehicle body 'y' axis of the vehicle 100 without rotating the vehicle body 102 about the 'y' axis.

It will be further appreciated that, in relation to a thrust vectoring module 146 to 152, provision may be made for one or more than one thrust producing means mounting bar on one side of the main body 102 to rotate independently about the arm axis of rotation relative to the mounting bar on the other side of the main body 102 by, for example, fixing the rotation of the arm relative to the body and introducing a separate bearing for each mounting bar to enable its independent rotation about the arm axis, or by splitting the arm in two at some point along its length). It will be further appreciated that in such an arrangement the rotation of a mounting bar on one side of the main body can be effected independently of the other side by a separate actuator for each mounting bar, or by independently controlling the moments about the mounting bar axis acting on each mounting arm by at least one or more forces or one or more moments, or a combination of one or more forces and one or more moments from the thrust producing means 118', 118" mounted to each arm. It will be further appreciated that if such a provision is made, the axes of rotation of each, or one or more than one, mounting bar may not be aligned. It will be further appreciated that a provision for such independent rotation of the mounting bars about the arm axis may optionally remove the requirement to rotate the mounting bars about their respective mounting bar axes in order to control the vehicle, as, for example, the differential from the thrust vectors from thrust producing means 118', 118" on opposing arms can be used to control the vehicle about its 'z' axis when the vehicle is in the orientation of FIG. 1.

Figure 2:
FIG. 2 is a detailed view of thrust vectoring module(s) according to example implementations.

Referring to FIG. 2, there is shown a close up view 200 of a thrust vectoring module. Example implementations of a thrust vectoring module can be varied. FIG. 2 illustrates several configurations of thrust vectoring modules; namely thrust vectoring module 202, thrust vectoring module 214 and thrust vectoring module 216. The thrust vectoring modules 202, 214, 216 are example implementations of one or more than one or all of the above described thrust vectoring modules 146 to 152. The thrust vectoring module 202 comprises a number of thrust producing means 204 to 210. The thrust producing means 204 to 210 are example implementations of the above described thrust producing means 118'. 118". In the example implementation depicted, the thrust vectoring module 202 comprises a number of thrust producing means disposed either side of the body 100, or at distal ends or positions of an arm 212, or arms 212', 212". The arm 212 is, or the arms 212', 212" are, an example of one or both of the arms 108, 110 described above. In the example shown, the thrust vectoring module 202 comprises four thrust producing means 204 to 210. The four thrust producing means 204 to 210 are positioned either side of the body 100. Alternatively or additionally, as indicated above, a thrust vectoring module can comprise a set of thrust producing means disposed on the same side of the body 100, or at the same end of the arm 212, in the same manner as the thrust vectoring modules 146 to 152 described above. FIG. 2 illustrates two such thrust vectoring modules 214, 216. Example implementations can be realised in which each thrust producing means 118', 118" comprises a respective motor 218 to 224. The motors 218 to 224 can be controlled independently of one another, or can be controlled in synchronisation with one another. The thrust vectoring module 202, or the thrust vectoring modules 214, 216, have respective arms 212', 212" with a common arm axis 226. The arm axis 226 is an example of any or all of the arm axes 114, 116 described above. Similarly, the thrust vectoring module 202 has, or the thrust vectoring modules 214, 216 have, have respective mounting bars 228, 230. The mounting bars are examples of the mounting bars 122 to 128 described above. Each mounting bar 228, 230 has a respective mounting bar axis 232, 234, which is comparable to the above described mounting bar axes 130 to 136.

Figure 3:
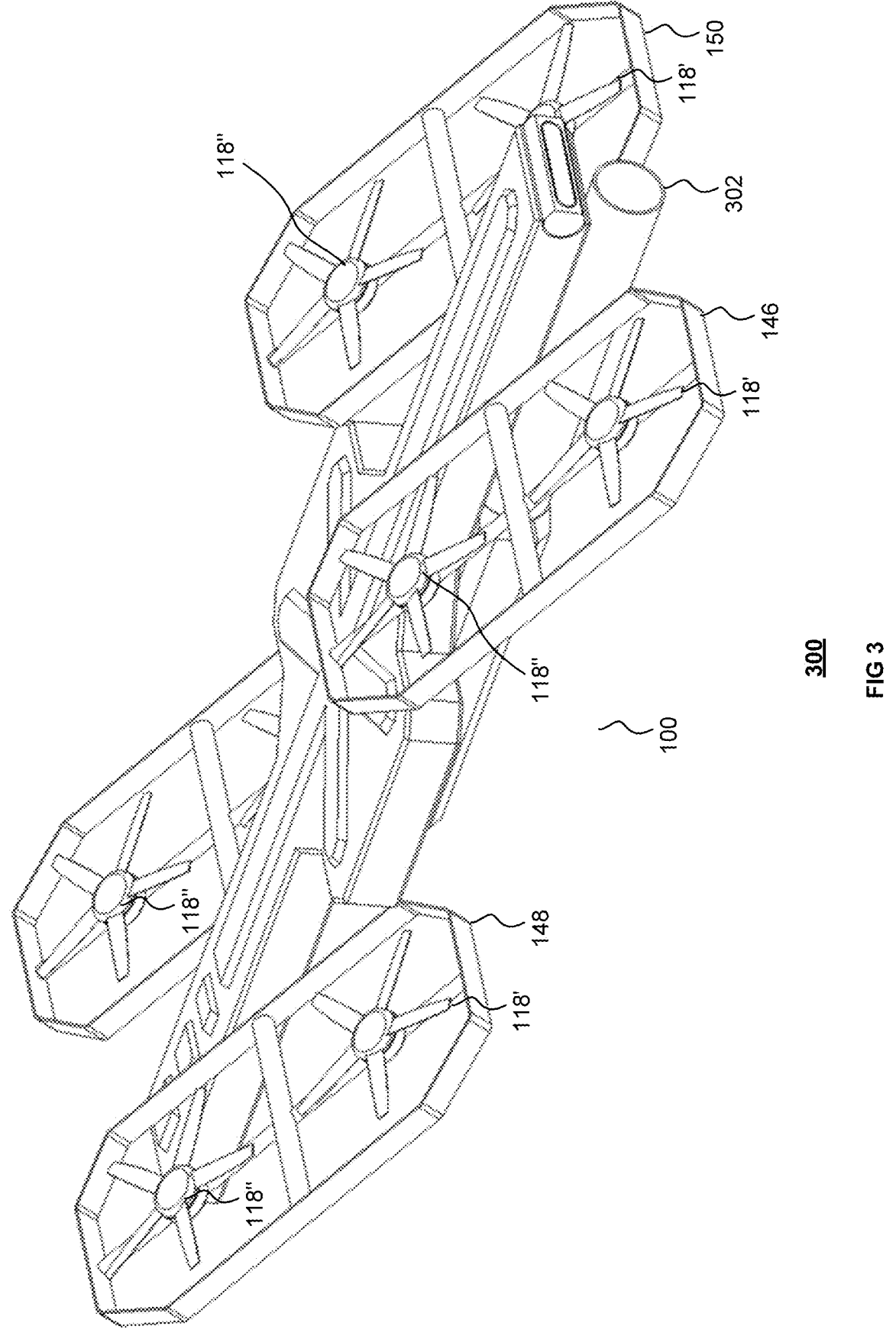
FIG. 3 is a perspective view of the vehicle with its thrust vectoring modules configured to propel the vehicle forwards according to example implementations.

Referring to FIG. 3 shows a view 300 of an arrangement demonstrating decoupling of the thrust vector from the vehicle body orientation. From the arrangement shown in FIG. 1, the vehicle 100 can be translated by tilting the entire vehicle 100, including the thrust vectoring modules 146 to 152, together in order to direct the resultant thrust vector acting on the vehicle body 102. In the arrangement of FIG. 3, the vehicle body 102 is maintained in a horizontal orientation, or any other orientation, while the net thrust from the thrust vectoring modules 146 to 152 acts to propel the vehicle 100 forward. This may, for example, allow a sensor or payload 302 that is incorporated into the vehicle body or rigidly attached thereto to maintain a horizontal, or other, orientation while the vehicle moves in a desired direction and/or accelerates at a desired rate. Furthermore, this arrangement may allow the vehicle to accelerate with a faster response time than the aforementioned alternative of FIG. 1 since the thrust producing means 118', 118" are not required to rotate the entirety of the vehicle 100 to the desired orientation, but rather only need to rotate the thrust vectoring modules 146 to 152. This can follow from the thrust vectoring modules have a lower moment of inertia as compared to the vehicle body, or vehicle as a whole. In this way, example implementations can be realised in which the attitude of the vehicle body 102 can be set, maintained or changed, independently of the orientation of the thrust vectoring modules 146 to 152, the angle of rotation or inclination of at least one, or both, of the mounting bar axes of rotation 130 to 136 or the arm axes of rotation 114, 116 taken jointly and severally in any and all permutations.

Referring to FIG. 4, there is shown a view 400 of the vehicle 100 of FIG. 1 in an arrangement in which thrust producing means mounting bars 122 to 128 have been rotated through an angle relative to the arms 108, 110 to which they are attached. This can be used to control vehicle 100 rotation about the vehicle body 'z' axis. In the example depicted, the front two mounting bars 122, 126 have been rotated to a position of 45 degrees while the rear two mounting bars 124, 128 have been rotated to a position of 135 degrees. Although the example illustrated has been described with reference to pairs of mounting bars; namely bars 122, 126 and bars 124, 128, having been rotated to the same position, example implementations are not limited to such an arrangement. Example implementations can be realised in which each mounting bar 122 to 128 can be rotated to the same position as any other mounting bar 122 to 128 or can be rotated to a respective, individual or different, position as compared to any other mounting bar 122 to 128.

Figure 5:
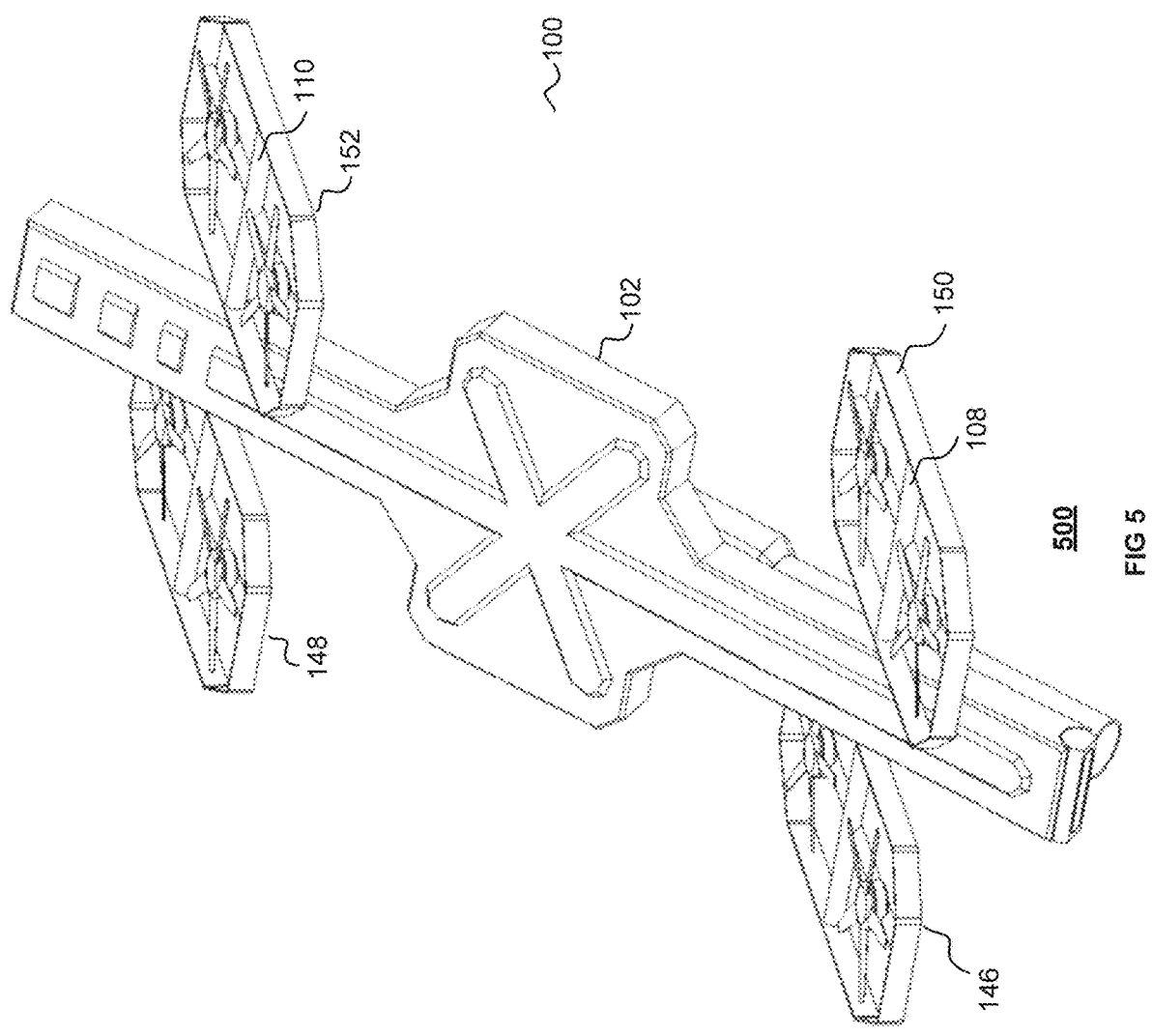
FIG. 5 is a perspective view of the vehicle hovering with its body oriented at an extreme pitch angle according to example implementations.

Referring to FIG. 5, there is shown a view 500 of the vehicle 100 of FIG. 1 in an arrangement in which each arm 108, 110 has been rotated through an angle relative to the vehicle body 102 and the vehicle body 102 has been rotated at an angle relative to the horizontal position of FIG. 1. In this arrangement, the decoupling of the thrust vector from the vehicle body orientation allows the vehicle body 102 to be maintained in a desired non-horizontal orientation while the thrust vectoring modules 146 to 152 are oriented such that the vehicle 100 can maintain a static hover or move in any direction, and/or give effect to any rotation, while maintaining the depicted vehicle body attitude.

It will be appreciated therefore that example implementations allow the vehicle body 'x' axis to attain desired directions while simultaneously independently applying a net thrust to the vehicle body to control desired translations and while simultaneously controlling the vehicle body 102 about its 'y' and 'z' axes. Example implementations can be realised in which any given vehicle body axis can assume a desired attitude while concurrently controlling or moving the vehicle body about any one or more other vehicles axes.

Figure 6:
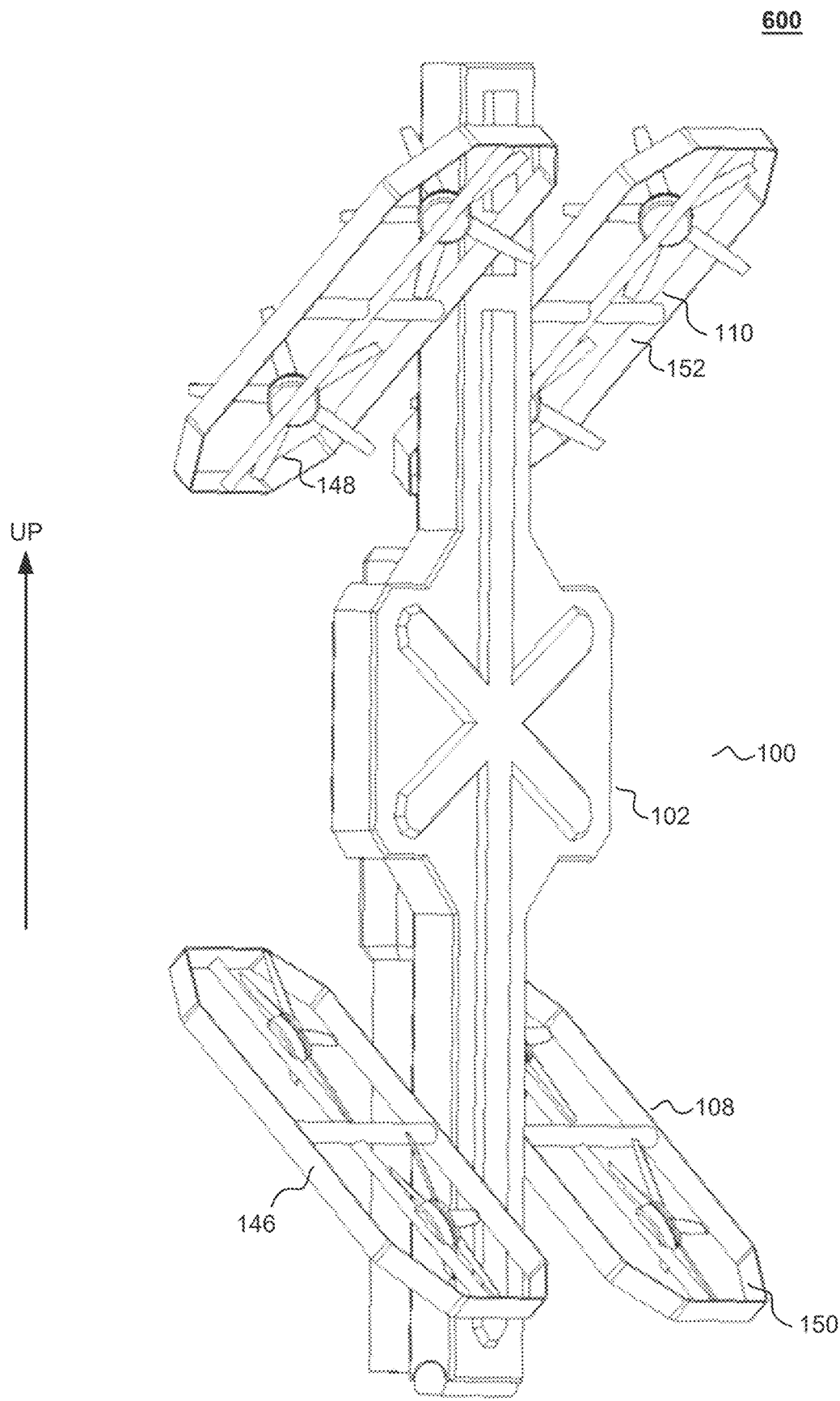
FIG. 6 is a perspective view of the vehicle with its thrust vectoring modules configured for an extreme manoeuvre according to example implementations.

FIG. 6 shows a view 600 of an example implementation of a position in which the vehicle body 'x' axis is oriented vertically. The thrust vectoring modules 146 to 152 can produce moments about all of the axes depending on the operation of the thrust producing means. A possible configuration of the thrust producing means, given the orientation of the thrust vectoring modules, would be a corkscrew or helical motion about the 'y' axis together with modulating, in time, the thrust from each thrust producing means to maintain the vehicle air borne. In such an arrangement the vehicle 100 can be controlled by rotating the arms 108, 110 of the thrust vectoring modules 146 to 152 relative to the body 102. It will be appreciated that the control scheme about the vehicle body 'y' axis as described with reference to FIG. 1 and that described with reference to FIG. 6 can, for example, be used, in combination or alternatively, to control the vehicle about its body 'y' axis over a range of positions.

Figure 7:
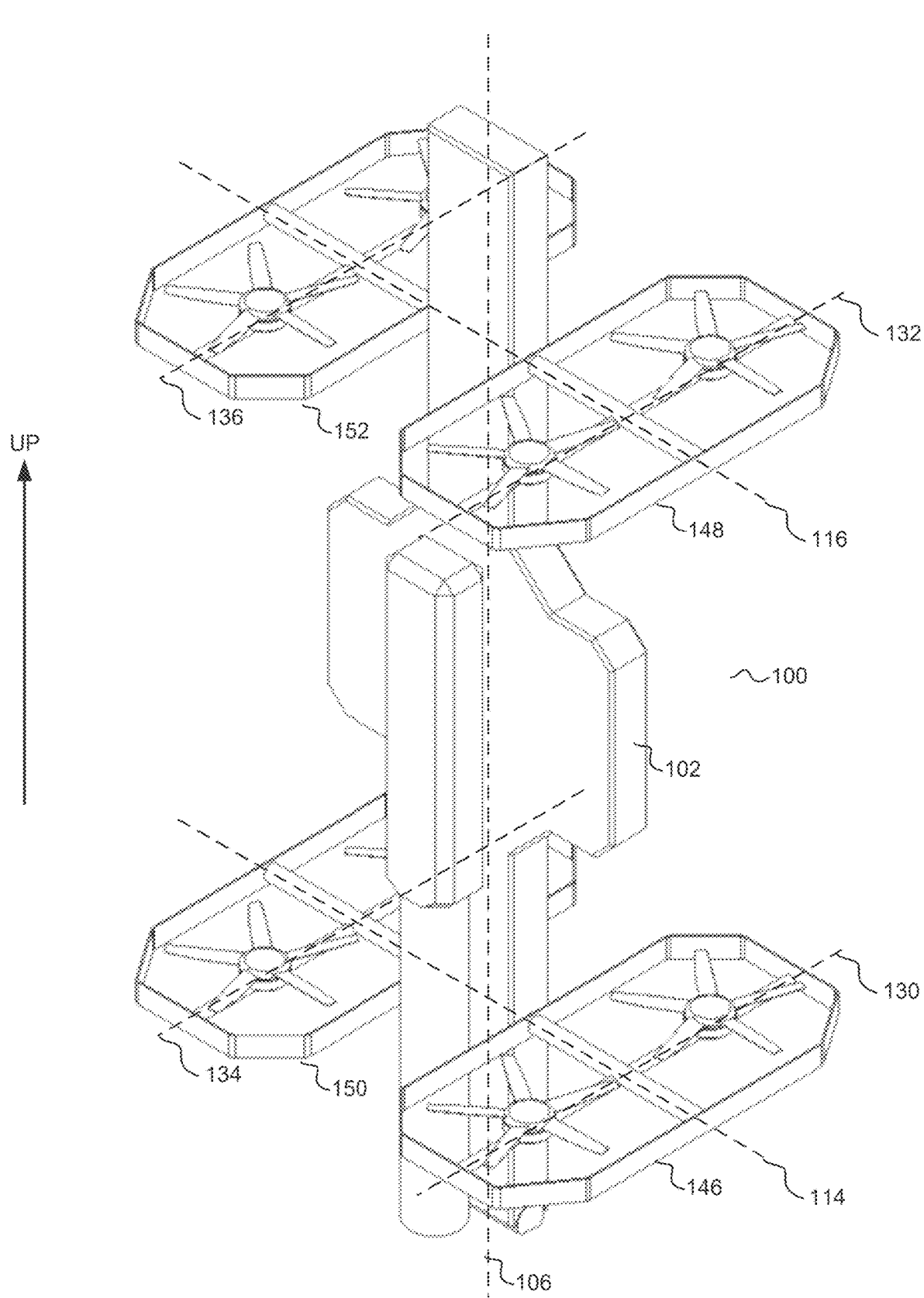
FIG. 7 is a perspective view of the vehicle configured to hover with the body in a vertical orientation and with the exhaust from the thrust producing means of one thrust vectoring module impinging on the thrust producing means of a second thrust vectoring module according to example implementations.

Referring to FIG. 7, there is shown a view 700 of the vehicle 100 vertically disposed. With the thrust vectoring modules 146 to 152 positioned as indicated, that is, the mounting bar axes of rotation 130 to 136 being perpendicular or orthogonal to the longitudinal axis 106 of the vehicle body 102, the vehicle 100 can hover, ascend or descend vertically. In such an arrangement, the net thrust differential between each of the thrust vectoring modules 146 to 152 cannot be used to control the vehicle body 102 about its 'y' axis without first causing their respective arms to rotate about their respective arm axes 114, 116 as these thrust vectors have no moment arm about the 'y' axis in the instantaneous configuration shown.

In example implementations the arms 108, 110 are free to rotate continuously relative to the vehicle body 102 about their rotation axis 114, 116. Thus, it will be appreciated that the vehicle body 102 can, for example, be rotated continuously while the vehicle remains in a hover with a static COG.

Figure 8:
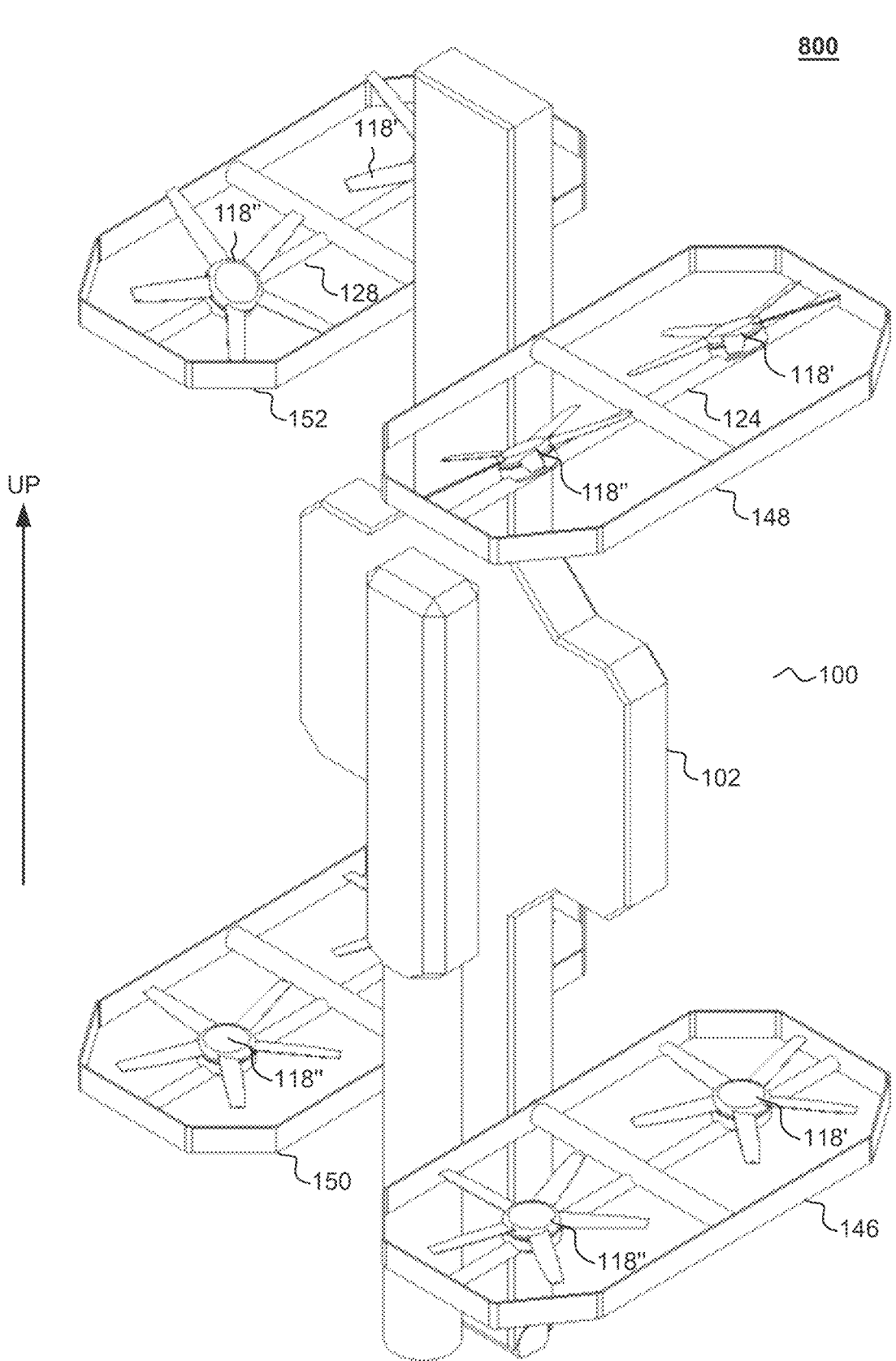
FIG. 8 is a perspective view of the vehicle configured to hover with the body in a vertical orientation and with the exhaust from the thrust producing means of one thrust vectoring module not impinging on the thrust producing means of a second thrust vectoring module according to example implementations.

FIG. 8 shows a view 800 of an arrangement that describes further aspects of example implementations. In the arrangement of FIG. 7, the thrust vectoring modules 146 to 152 are rotated to a position in which one or more of the thrust producing means 118', 118" of one thrust vectoring module such as, for example, one, or both, of thrust vectoring modules 148, 152, impinges on, or otherwise interferers with or influences, a thrust producing means 118', 118" of another thrust vectoring module such as one, or both, of thrust vectoring modules 146, 150. Example implementations can be realised in which at least one, both or more, of the thrust vectoring modules or thrust producing means 118', 118" can be positioned or oriented to at least reduce or eliminate such impingement, interference or influence. In the example depicted in FIG. 7, it can be seen that the thrust producing means 118', 118" of the upper thrust vectoring module or modules 148, 152 are, in this position, propelling fluid directly towards the thrust producing means 118', 118" of the lower thrust vectoring module or modules 146, 150. It will be appreciated that this can have undesirable effects on the thrust produced from the thrust producing means 118', 118" of the lower thrust vectoring module or modules 146, 150. Therefore, example implementations allow the thrust producing means 118', 118" of the upper thrust vectoring module or modules 148, 152 to be rotated as shown in FIG. 8 by rotating the mounting bars 124, 128. The thrust producing means 118', 118" are operated such that the net thrust of each, in at least one, or both, of the 'y' or 'z' axis direction, balance or otherwise cancel, that is, without introducing a net moment or force acting on the vehicle body in the 'yz' plane. This alleviates, or at least reduces, problematical interference between the thrust vectoring modules without introducing a net moment or force acting on the vehicle body.

Figure 9:
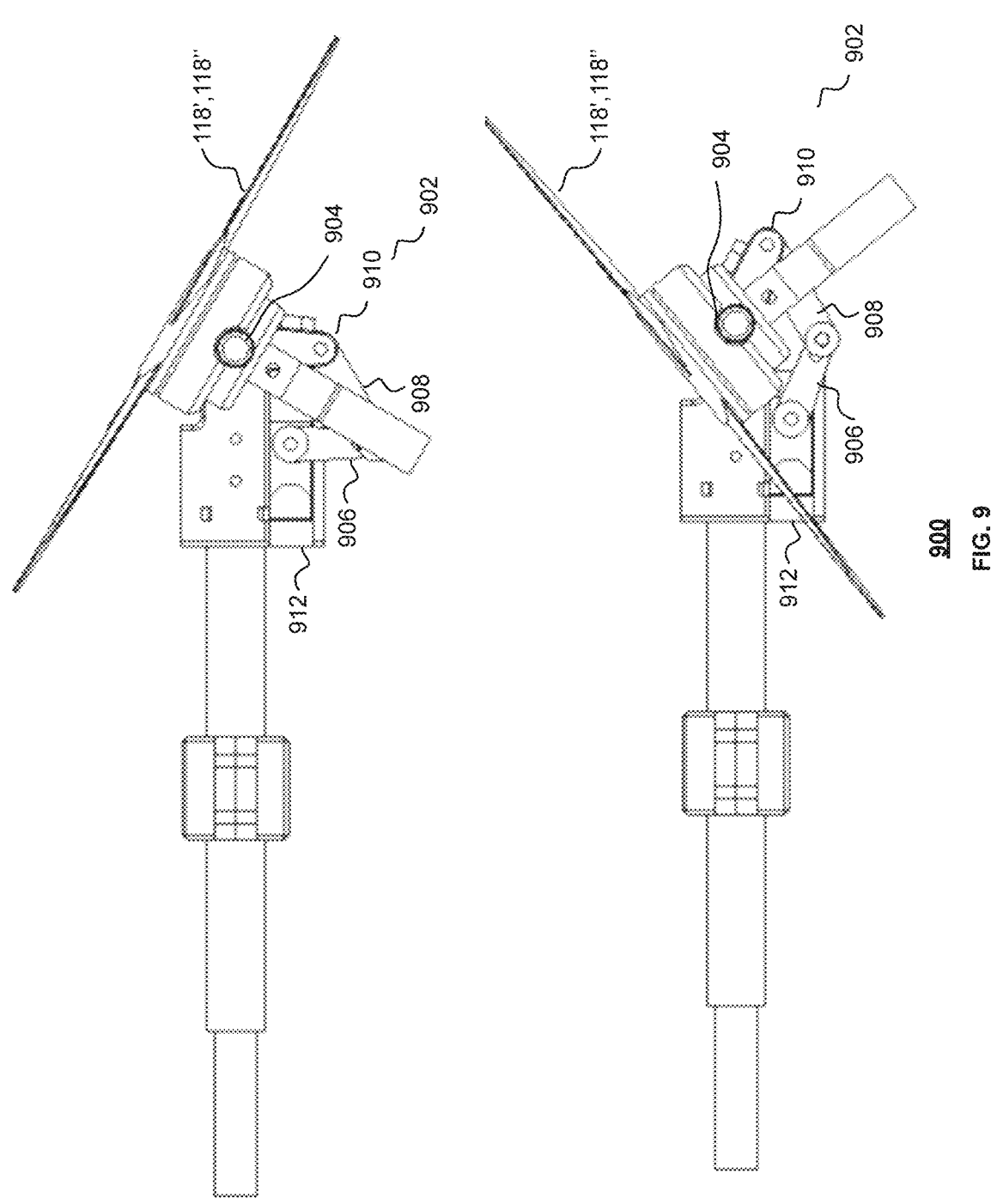
FIG. 9 is a detailed view of a thrust producing means of a thrust vectoring module whereby an axis of rotation of the thrust producing means is controlled by an actuator according to example implementations.

FIG. 9 shows a pair of views 900 of an example mechanism 902 to rotate mounting bars 122 to 128. The example mechanism 902 is an example implementation of an actuator such as any of the actuators described herein. The rotor, that is, the thrust producing means 118', 118" is mounted on a mounting bar 904. The mounting bar 904 is an example implementation of any of the mounting bars 122 to 128 described herein. The thrust producing means 118', 118" is rotatably coupled, via a number of linkages 906 to 910. A first linkage 906 is driven by, or coupled to, a servomotor 912. The servomotor 912 controls the rotation and orientation of the thrust producing means 118', 118" by rotating the first linkage 906 that, in turn, rotates the thrust producing means 118', 118". The linkages are arranged to control rotation of the thrust producing means about a respective mounting bar axis. It will be appreciated that but for the thrust producing means being distally disposed from a respective arm, there would be mechanical interference between a rotor of the thrust producing means and the respective arm.

Figure 10:
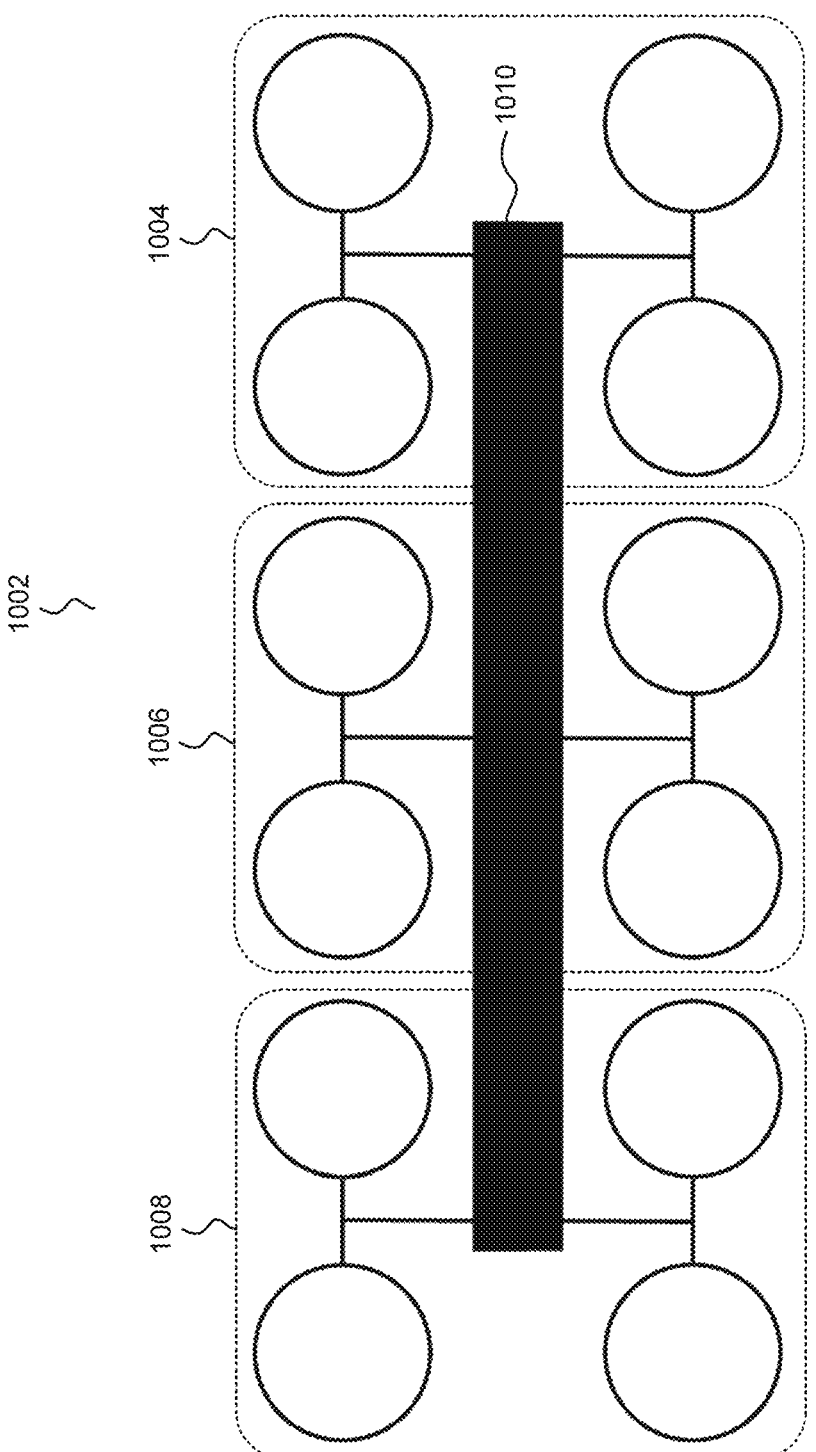
FIG. 10 is a diagram showing a plan view of an arrangement of three thrust vectoring modules affixed to an elongate body according to example implementations.

FIG. 10 shows a view 1000 of an alternative example implementation of a vehicle 1002 comprising a number of thrust vectoring modules. In the example illustrated there are three thrust vectoring modules 1004 to 1008 arranged linearly along a vehicle body 1010. The vehicle 1002 is an example of any of the vehicles described herein such as, for example, the above described vehicle 100. Similarly, the thrust vectoring modules 1004 to 1008 are examples of any of the thrust vectoring modules described herein such as, for example, thrust vectoring modules 146 to 152 and/or the thrust vectoring module 202 or modules 214, 216 described with reference to FIG. 2. Although the example illustrated comprises three thrust vectoring modules, example implementations are not limited to such an arrangement. Example implementations can be realised in which there are one, two, three or more than three thrust vectoring modules.

Figure 11:
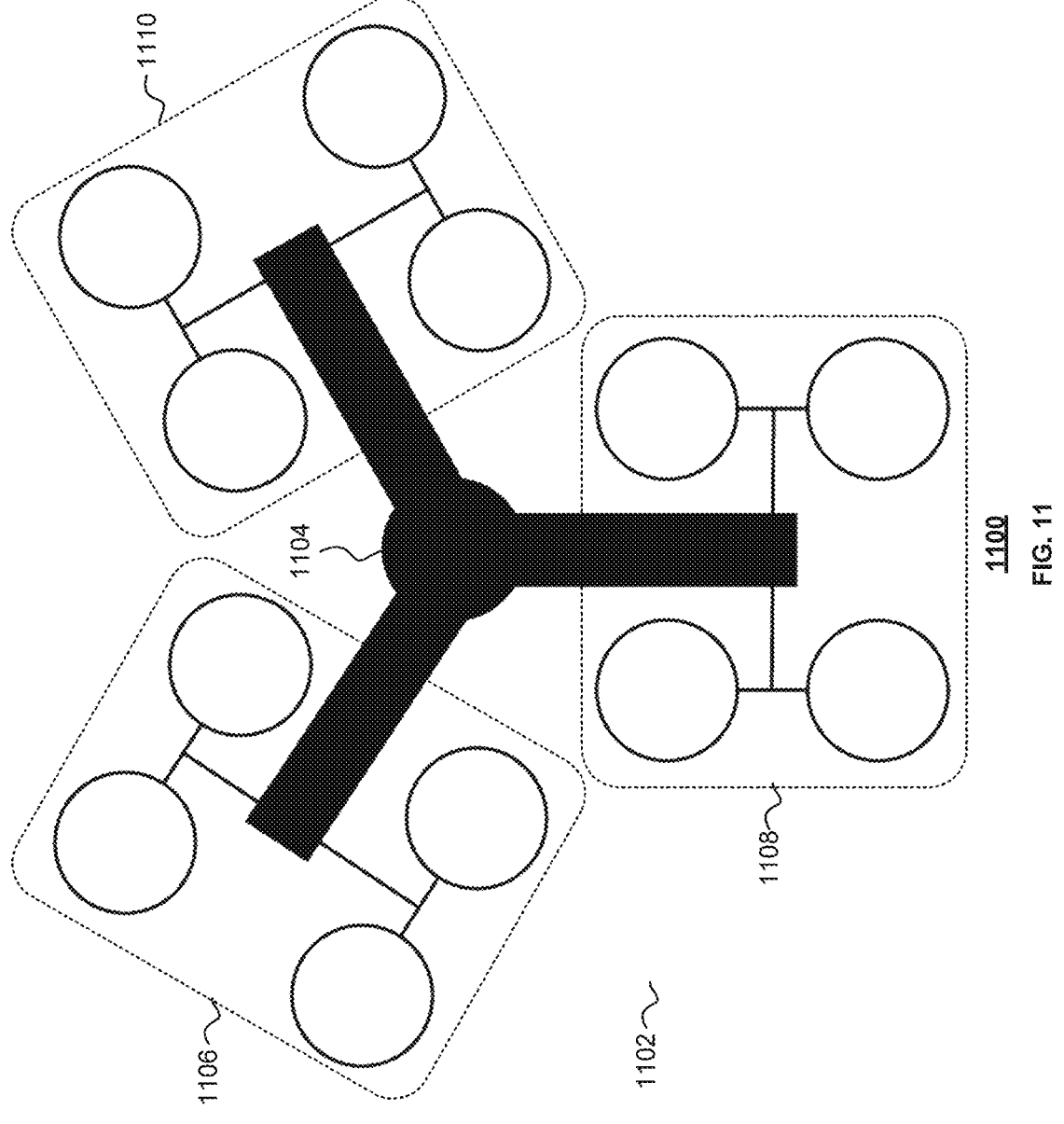
FIG. 11 is a diagram showing a plan view of an arrangement of three thrust vectoring modules affixed to a 'Y' shaped body according to example implementations.

FIG. 11 shows a view 1100 of an alternative example implementation of a vehicle 1102 in which there are a plurality of thrust vectoring modules arranged on a vehicle body 1104. In the example depicted, the vehicle comprises three thrust vectoring modules 1106 to 1110 arranged on a vehicle body 1104. The vehicle 1102 is an example of any of the vehicles described herein such as, for example, the above described vehicle 100. Similarly, the thrust vectoring modules 1106 to 1110 are examples of any of the thrust vectoring modules described herein such as, for example, thrust vectoring modules 146 to 152 and/or the thrust vectoring module or modules 202, 214, 216 described with reference to FIG. 2. Although the example depicted comprises three thrust vectoring modules, example implementations are not limited to such an arrangement. Example implementations can be realised in which there are one, two, three or more than three thrust vectoring modules.

Figure 12:
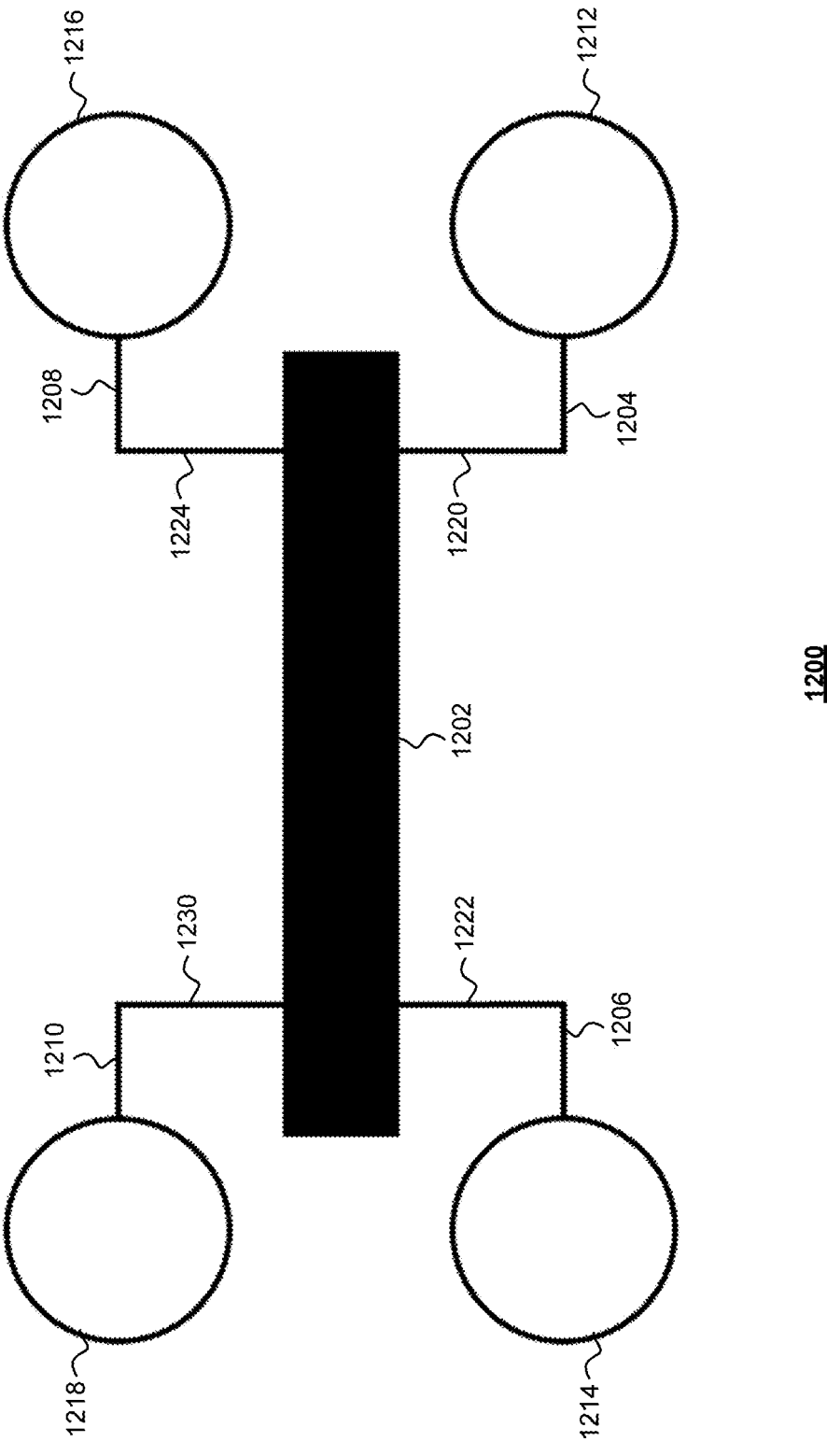
FIG. 12 is a diagram showing a plan view of a vehicle comprising two thrust vectoring modules, wherein each module comprises a pair of thrust producing means, each thrust producing means disposed on either side of an elongate body according to example implementations.

FIG. 12 shows a view 1200 of an alternative example implementation of a vehicle 1202 in which each mounting bar 1204 to 1210 has only a single thrust producing means 1212 to 1218 attached thereto. Such an arrangement does not allow the angle of each arm 1220 to 1230 to be controlled by the differential thrust between two thrust producing means as does the arrangement shown in the preceding figures. As such, the angle is controlled using an actuator. Example implementations of the actuator can be realised as described above in FIG. 9. Such an arrangement may use fewer thrust producing means 1212 to 1218 than the arrangement shown in, for example, FIG. 1. Such an arrangement may use a larger number of non-thrust producing actuators and may have a greater response time than the example implementations described with reference to FIG. 1.

The vehicle 1202 is an example of any of the vehicles described herein such as, for example, the above described vehicle 100. Similarly, the thrust producing means 1212 to 1218 are examples of any of the thrust producing means described herein such as, for example, thrust producing means 204 to 210 described with reference to FIG. 2. Although the example depicted comprises two thrust vectoring modules, example implementations are not limited to such an arrangement. Example implementations can be realised in which there are one, two or more than two thrust vectoring modules.

Figure 13:
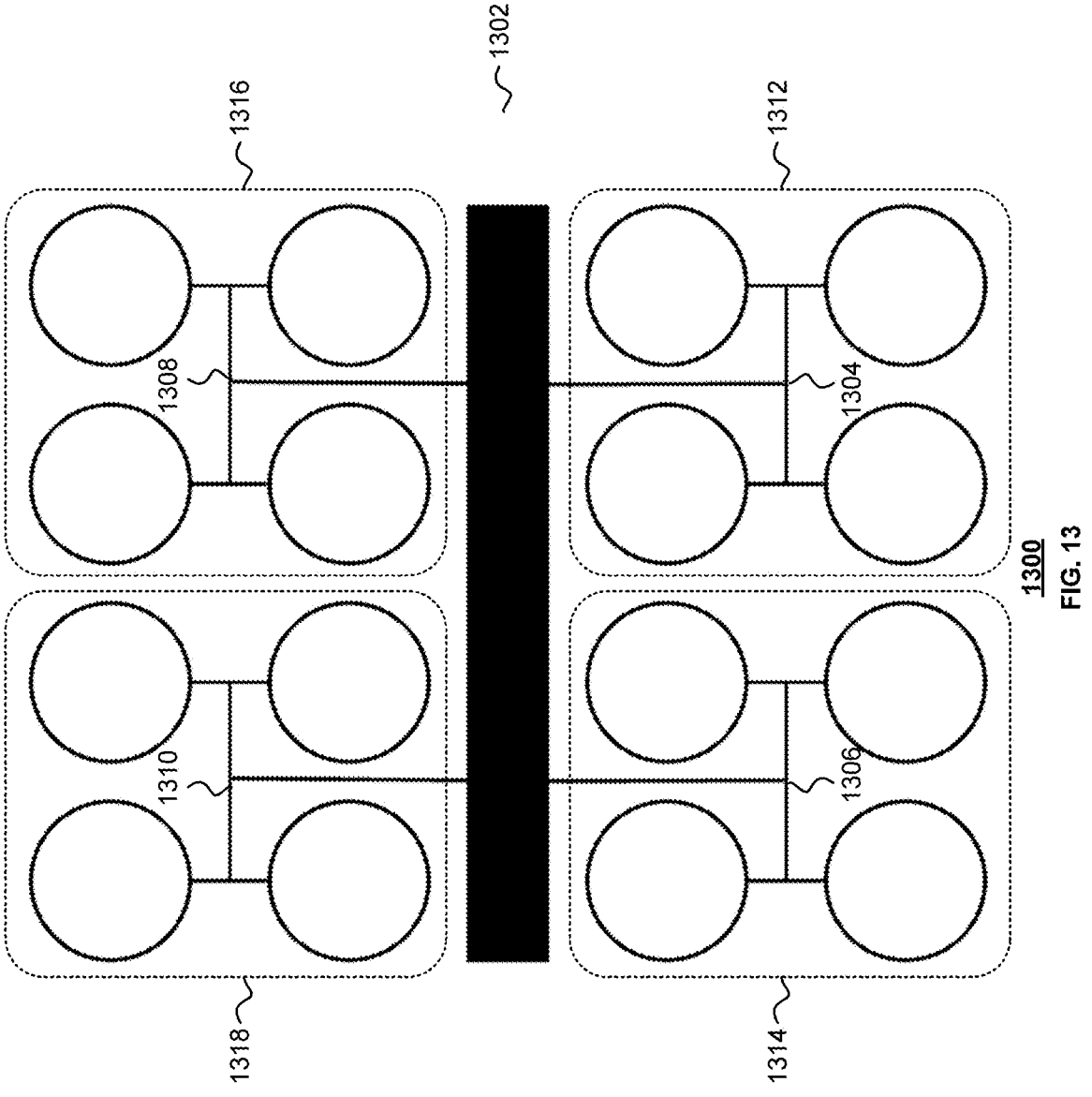
FIG. 13 is a diagram showing a plan view of a vehicle according to example implementations, wherein each thrust vectoring module comprises two quartets of thrust producing means, such that individual control of the thrust producing means is sufficient (without additional actuation) to control the net force and moment applied to the vehicle by a thrust vectoring module.

FIG. 13 shows a view 1300 of an alternative example implementation of a vehicle 1302 in which each mounting bar 1304 to 1310 has a plurality of thrust producing means. In the example shown, the vehicle 1302 comprises four thrust vectoring modules 1312 to 1318 attached thereto. Such an arrangement allows the angles of the mounting bars 1304 to 1310 to be controlled with thrust differentials in a manner analogous to that with which the angle of the arms is controlled in various implementations described herein. Such an arrangement may use fewer non-thrust producing actuators than the arrangement shown in, for example, FIG. 1. Such an arrangement may use a larger number of thrust producing means 1312 to 1318.

The vehicle 1302 is an example of any of the vehicles described herein such as, for example, the above described vehicle 100. Similarly, the thrust vectoring modules 1312 to 1318 are examples of any of the thrust vectoring modules described herein such as, for example, thrust vectoring modules 146 to 152 and/or the thrust vectoring module or modules 202, 214, 216 described with reference to FIG. 2. Although the example depicted comprises four thrust vectoring modules, example implementations are not limited to such an arrangement. Example implementations can be realised in which there are one, two, three, four or more than four thrust vectoring modules.

It will be appreciated that where the rotation of the arms and/or mounting bars are controlled by actuators, it may be possible to use differential thrust to apply moments about the rotational axes, which may, for example, allow control of the vehicle body about an axis without rotation of one or more of the arms or mounting bars.

FIGS. 14A-D shows views 1400 of example implementations of thrust vectoring modules.

FIG. 14A shows a view 1400A of an example implementation in which a thrust vectoring module 1402A is rotatably attached to a vehicle body at a mounting point 1404A via a rotatable arm 1406A. The thrust vectoring module has a number of thrust producing means. In the example shown, the thrust vectoring module 1402A comprises two thrust producing means 1408A, 1410A attached to a mounting bar 1412A. Rotation of the arm 1406A about a respective rotation axis 1414A is controlled using at least one of differential thrusts or differential moments between the two thrust producing means 1408A, 1410A.

FIG. 14B depicts a view 1400B of an example implementation in which a thrust vectoring module 1402B is rotatably attached to a vehicle body at a mounting point 1404B via a rotatable arm 1406B. The thrust vectoring module 1402B comprises a plurality of thrust producing means. In the example depicted, the thrust vectoring module 1402B comprises two thrust producing means 1408B, 1410B attached to a mounting bar 1412B. Rotation of the arm 1406B about a respective rotation axis 1414B is controlled using at least one of differential thrusts or differential moments between two thrust producing means 1408B, 1410B. Rotation of the mounting bar 1412B can also be effected about a further rotation axis 1416B. The rotation of the mounting bar 1412B about the further axis of rotation 1416B can be effected using an actuator.

FIG. 14C shows a view 1400C of an example implementation in which a thrust vectoring module 1402C is rotatably attached to a vehicle body at a mounting point 1404C via a rotatable arm 1406C. The thrust vectoring module 1402C comprises a predetermined number of thrust producing means. In the example implementation shown, the thrust vectoring module 1402C comprises four thrust producing means 1408C, 1410C', 1408C, 1410C', two attached to each of two mounting bars 1412C, 1412C' attached along the arm 1406C rotation axis on either side of the mounting point 1404C. Rotation of the arm 1406C about a respective rotation axis 1414C is controlled using at least one of differential thrusts or differential moments between thrust producing means 1408C, 1410C, 1408C', 1410C'.

FIG. 14D shows a view 1400D of an example implementation in which a thrust vectoring module 1402D is rotatably attached to a vehicle body at a mounting point 1404D via a rotatable arm 1406D. The thrust vectoring modules 1402D comprises a predetermined number of thrust producing means. In the example implementation shown, the thrust vectoring module 1402D comprises four thrust producing means 1408D, 1410D, 1408D', 1410D'; two attached to each of two mounting bars 1412D, 1412D' attached along the arm rotation axis 1414D on either side of the mounting point 1404D wherein the rotation of the arm 1406D about its rotation axis 1414D is controlled using at least one of differential thrusts or differential moments between thrust producing means 1408D, 1410D, 1408D', 1410D' and wherein the mounting bars 1412D, 1412D' are controllably rotatable about at least one or more further rotation axis or axes 1416D, 1416D'. The rotation of the mounting bars 1412C or 1412C' about the rotation axis or axes 1416D, 1416D' can be effected using an actuator.

The vehicles depicted in FIG. 14 are examples of any of the vehicles described herein such as, for example, the above described vehicle 100. Similarly, the thrust vectoring modules 1402A-D are examples of any of the thrust vectoring modules described herein such as, for example, thrust vectoring modules 146 to 152 and/or the thrust vectoring module or modules 202, 214, 216 described with reference to FIG. 2. Although the examples shown comprise a given number of thrust vectoring modules, example implementations are not limited to such arrangements. Example implementations can be realised in which there are one, two, three, four or more than four thrust vectoring modules.

FIGS. 15A and 15B show views 1500 of example implementations of thrust vectoring modules.

FIG. 15A shows a view 1500A of an example implementation in which a thrust vectoring module 1502A is rotatably attached to a vehicle body at a mounting point 1504A via a rotatable arm 1506A. The thrust vectoring module 1502D comprises a predetermined number of thrust producing means. In the example implementation illustrated, the thrust vectoring module 1502A has four thrust producing means 1508A, 1510A, 1508A', 1510A' attached to a mounting bar 1512A. Rotation of the arm 1506A about a respective rotation axis 1514A is controlled using at least one of differential thrusts or differential moments between thrust producing means 1508A, 1510A, 1508A', 1510A', and wherein the mounting bar 1512A is controllably rotatable about a further rotation axis 1516A using at least one of differential thrusts or differential moments between thrust producing means 1508A, 1510A, 1508A', 1510A' or selected subsets of the thrust producing means 1508A, 1510A, 1508A', 1510A' and/or an actuator to rotate the mounting bar 1512A.

FIG. 15B shows a view 1500B of an example implementation in which a thrust vectoring module 1502B is rotatably attached to a vehicle body at a mounting point 1504B via a rotatable arm 1506B. The thrust vectoring module 1502B comprises a predetermined number of thrust producing means. In the example implementation shown, the thrust vectoring module 1502B has eight thrust producing means 1508B, 1510B to 1508B''', 1510B''', four of which are attached to each of two mounting bars 1512B, 1512B'. Rotation of the arm 1506B about a respective rotation axis 1514B is controlled using at least one of differential thrusts or differential moments between thrust producing means 1508B, 1510B to 1508B''', 1510B''', and wherein the mounting bars 1512B, 1512B' are each controllably rotatable about further rotation axes 1516B, 1516B' using at least one of differential thrusts or differential moments between thrust producing means 1508B, 1510B to 1508B''', 1510B''', or selected subsets of the thrust producing means 1508B, 1510B to 1508B''', 1510B'''.

Figure 16:
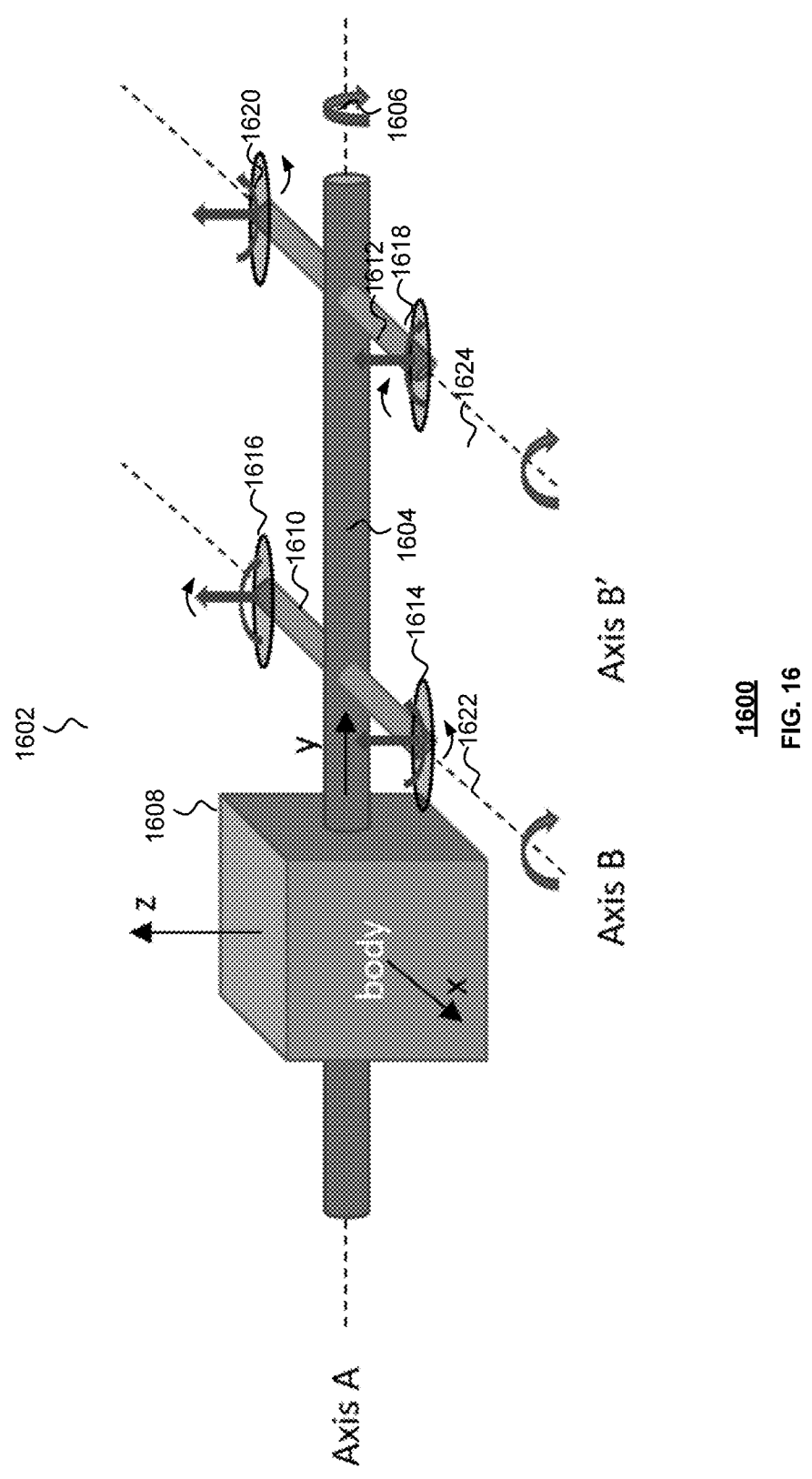
FIG. 16 depicts a thrust vectoring module according to example implementations.

Referring to FIG. 16, there is shown a view 1600 of a thrust vectoring module 1602 comprising an arm 1604 having an arm axis 1606. The arm 1604 can be mounted or otherwise rotatably coupled to a vehicle body 1608. The arm 1604 has a number of mounting bars. In the example implementation shown the arm 1604 has two mounting bars 1610, 1612. However, example implementations are not limited to such an arrangement. Example implementations can be realised in which the arm 1604 has two or more mounting bars.

Each mounting bar 1610, 1612 bears a set of thrust producing means. In the example shown, each mounting bar has a respective plurality of thrust producing means. The example implementation depicted comprises a pair of thrust producing means 1614, 1616 disposed on the mounting bar 1610 proximal to the vehicle body 1608, and a pair of thrust producing means 1618, 1620 disposed on the mounting bar 1612 distal to the vehicle body 1608. In the example shown, thrust producing means 1614, 1616 are counter rotating rotors. One thrust producing means 1614 is arranged to rotate clockwise, applying an anti-clockwise torque to mounting bar 1610, while the other thrust producing means 1616 is arranged to rotate anti-clockwise, producing a clockwise torque to mounting bar 1610. Similarly, in the example shown, thrust producing means 1618, 1620 are counter rotating rotors. One thrust producing means 1618 is arranged to rotate anti-clockwise, applying a clockwise torque to mounting bar 1612, while the other thrust producing means 1620 is arranged to rotate clockwise, applying an anti-clockwise torque to mounting bar 1612.

Example implementations that provide such counter-rotating rotors or counter-acting thrust producing means that have thrust lines (not shown) that intersect an axis to be controlled, such as, for example, one, or both, of axes 1622, 1624 of the mounting bars 1610, 1612 realises at least one, or both, of a lower mass moment of inertia about those axes or a reduced actuation resistance due to a lower gyroscopic effect that, in turn, reduces actuator load. Still further, example implementations, having a plurality of mounting bars per arm bearing multiple thrust producing means such as, for example, two mounting bars per arm each with two rotors, experience, as the bars are rotated, a component of differential thrust able to produce a moment about the arm axis that diminishes until, when the thrust producing means axes are parallel to the arm axis, the differential thrust cannot contribute to the moment at all, at which point, example implementations use torque differentials across the thrust producing means to provide a turning moment about the arm axis. However, since a torque differential is typically related to a corresponding thrust differential, an undesirable coupling can result. The coupling can, nevertheless, be at least reduced, or removed, by providing further thrust producing means acting about the arm as depicted in FIG. 16, where a net thrust acts along the arm axis 1606 whilst a net moment acts about the arm axis as shown in FIG. 17.

Figure 17:
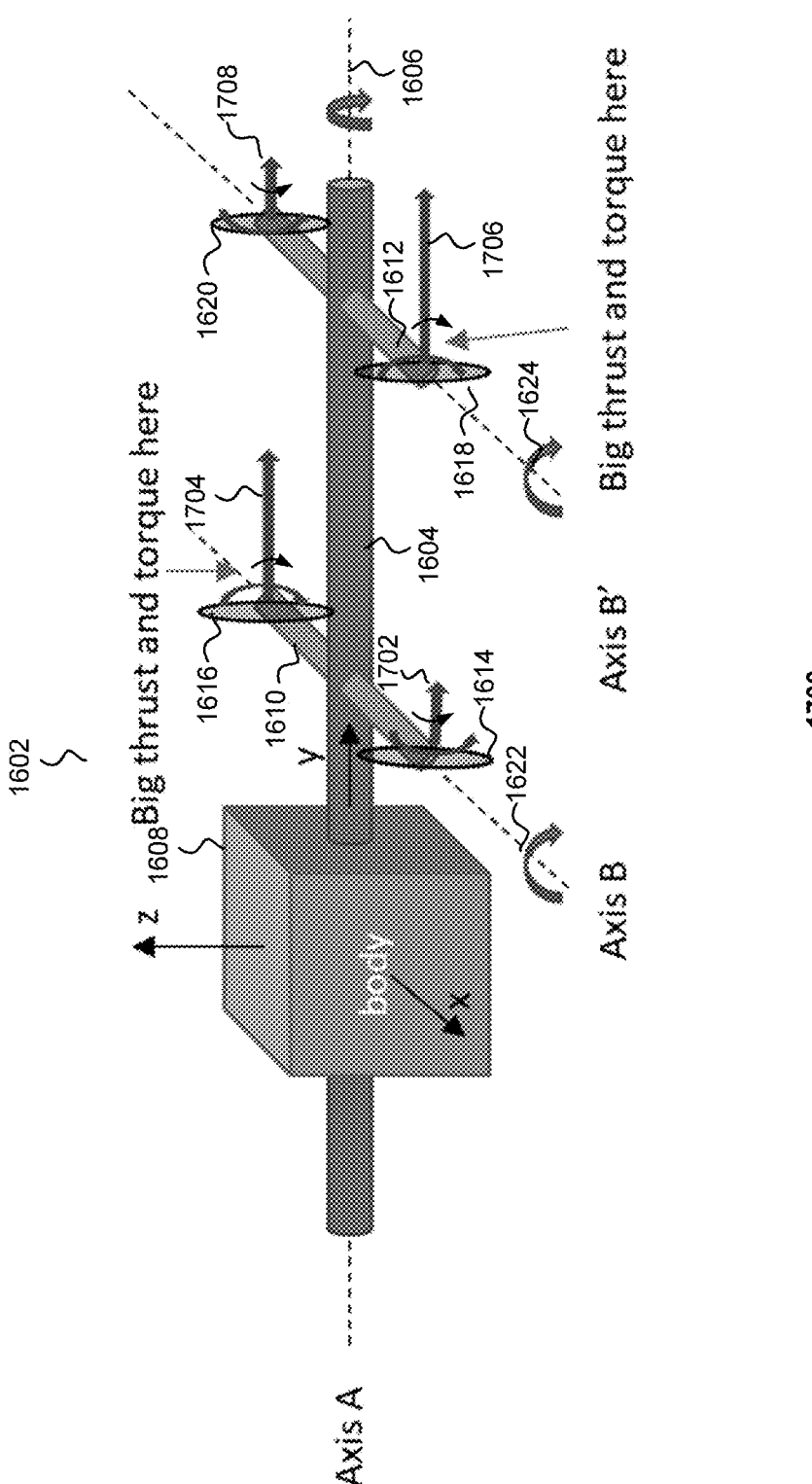
FIG. 17 illustrates balanced torque and thrust differentials according to example implementations.

Referring to FIG. 17, there is shown a view 1700 of the example implementation described with reference to FIG. 16, in which thrust differentials and torque differentials are decoupled using multiple rotor bearing mounting bars 1610, 1612 coupled to the same arm 1604. The thrust and torque 1702, 1704 associated with the thrust producing means 1614, 1616 respectively, in conjunction with the torque and thrust 1706, 1708 associated with the thrust producing means 1618, 1620 respectively, lead to a net moment about the arm axis 1606 that can be controlled independently of a net force generated along the arm axis 1606, whilst introducing no moment on the arm axis 1606 in any plane in which said arm axis lies.

Example implementations that use one or more actuators rather than thrust or torque differentials produced by the thrust producing means to control rotation about an axis can reduce the need for additional thrust producing means that, in turn, since additional thrust producing means would tend to be smaller and less efficient for a given size of vehicle, results in reduced vehicle efficiency. Conversely, example implementations that use thrust or torque differentials produced by thrust producing means to control rotation about an axis remove the need for an actuator at all, or can allow a smaller actuator to be used and can result in an improved system or control response. The selection of an appropriate combination of actuation and the application of thrust or torque differentials produced by thrust producing means is key to vehicle performance.

Consequently, example implementations that use actuators to control the rotation of the mounting bar axes can reduce the need for as many smaller, less efficient, thrust producing means. Example implementations can be realised that use two thrust producing means per mounting bar where an actuator is used to rotate that mounting bar about its mounting bar axis. Beneficially, such an arrangement wherein the two thrust producing means lie close to the mounting bar axis provide for a low mass moment of inertia about the mounting bar axis. Furthermore, where the two thrust producing means comprise a pair of counter-rotating rotors, gyroscopic effect about the mounting bar axis is also low. Both these attributes make the mounting bar axis in such an arrangement amenable to actuation. Example implementations that use such an arrangement do not need to additionally actuate the arm axis, since rotation about the arm axis in such an arrangement may be controlled by net thrusts and/or moments produced by the thrust producing means on the mounting bars. Consequently, having the arm axis controlled by a net moment produced by the thrust producing means and having the two mounting bars' 1610, 1612 rotation controlled by actuation results in both a highly responsive and efficient vehicle.

In such an arrangement it will be appreciated that moments about the arm axis 1606 are generated by the thrust producing means 1614, 1616 and 1618, 1620 disposed either side of the arm axis 1606. Beneficially, since the thrust producing means lie on either side of the arm axis 1606, rotation of the thrust producing means 1614 to 1620 about their respective mounting bar axes is unconstrained by the risk of collision with the arm 1604, and rotation about a mounting bar axis can be readily effected using an actuator since each thrust producing means axis substantially intersects its respective mounting bar. (Since each thrust producing means axis substantially intersects a respective mounting bar axis, the thrust producing means cannot produce large moments about their respective mounting bar axes; such large moments could be detrimental to actuation, could require a more powerful actuator to overcome such moments, or could require a more complex control system to synchronise moments produced by the actuator with moments produced by the thrust producing means.)

A thrust vectoring module comprising a single mounting bar and no actuators can apply a net force and moment to the vehicle body, but the force and moment will be coupled in magnitude such that at least three such modules would be required to control the vehicle in six degrees of freedom. Conversely, a thrust vectoring module comprising multiple mounting bar axes and no actuator can apply a force and moment to the vehicle body that are decoupled in magnitude such that only two such modules are required to control the vehicle in six degrees of freedom.

Any or all of the example implementations described herein can carry one or more sensors, one or more payloads, one or more actuators, one or more effectors or the like.

Figure 18:
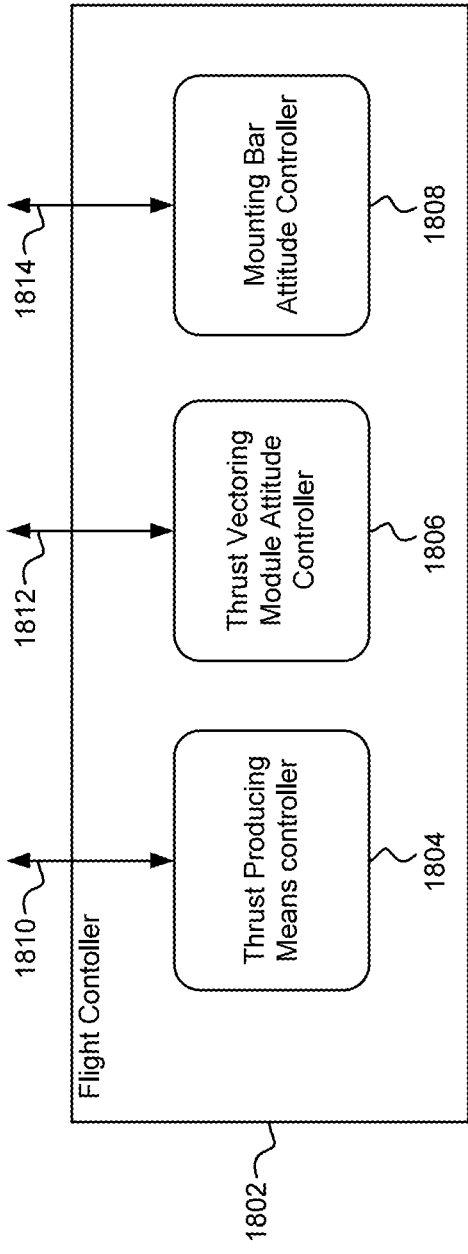
FIG. 18 depicts a flight controller according to example implementations.

Referring to FIG. 18, there is shown a view 1800 of a flight controller 1802 of any vehicle according to example implementations. The controller 1802 comprises a thrust producing means controller 1804 for controlling the thrust producing means of example implementations. Controlling the thrust producing means comprises controlling at least one or more of controlling rotor speed, rotor collective pitch, forces or moments associated with the thrust producing means taken jointly and severally in any and all permutations. The controller 1802 comprises thrust vectoring module attitude controller 1806 to control the attitude of the thrust vectoring modules of example implementations. The controller 1802 comprises a mounting bar attitude controller 1808 to control the rotation of the mounting bars according to example implementations. Each of the controllers 1804 to 1808 can output data or signals 1810 to 1814 respectively for controlling the thrust producing means, thrust vectoring modules and mounting bars respectively. Although the flight controller 1802 comprises attitude controllers 1806 and 1808, one skilled in the art will appreciate that these controllers 1806, 1808 may additionally or alternatively act to control rotational accelerations and rates.

It will be appreciated that the controllers and any associated circuitry as used herein can comprise any of physical electronic circuitry, software (such as machine-readable and machine-executable instructions), hardware, application specific integrated circuitry, or the like, taken jointly or severally in any and all permutations.

Therefore, implementations also provide machine-readable storage storing such machine-executable instructions. The machine-readable storage can comprise transitory or non-transitory machine-readable storage. The machine can comprise one or more processors, or other circuitry, for executing the instructions or implementing the instructions.

Figure 19:
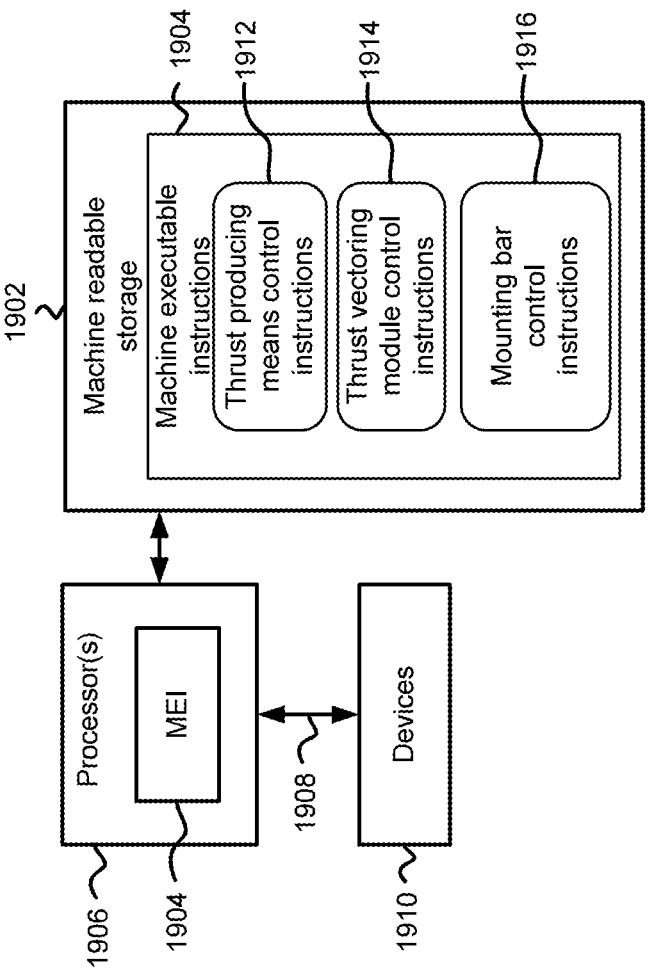
FIG. 19 illustrates machine-readable storage and machine-executable instructions according to example implementations.

Accordingly, referring to FIG. 19, there is shown a view 1900 of implementations of machine-readable storage 1902. The machine-readable storage 1902 can be realised using any type of volatile or non-volatile storage such as, for example, memory, a ROM, RAM, EEPROM, or other electrical storage, or magnetic or optical storage or the like. The machine-readable storage 1902 can be transitory or non-transitory. The machine-readable storage 1902 stores machine-executable instructions (MEIs) 1904. The MEIs 1904 comprise instructions that are executable by a processor or other instruction execution, or instruction implementation, circuitry 1906. The processor or other circuitry 1906 is responsive to executing or implementing the MEIs 1904 to perform any and all activities, operations, or methods described and/or claimed in this application such as the operations described with reference to at least one or more of FIGS. 1 to 18.

The processor or other circuitry 1906 can output one or more than one control signal 1908 for controlling other devices 1910. Example implementations of such other devices 1910 comprise, for example, at least one or more than one of thrust producing means, thrust vectoring modules, mounting bars or actuators taken jointly and severally in any and all permutations.

Suitably, the machine-executable instructions 1904 comprises machine-executable instructions for controlling the vehicle during, for example, flight in the case of an air vehicle, or submersion in the case of a submersible vehicle. The machine-executable instructions comprise instructions 1912 to control the thrust producing means, instructions 1914 to control the thrust vectoring modules and instructions 1916 to control the mounting bars.

It will be appreciated that any or all of the thrust vectoring modules described herein can comprise at least one thrust producing means mounted on a respective mounting bar that is rotatably coupled to a respective arm. Any and all example implementations can be realised in which a thrust vectoring module comprises a plurality of thrust producing means mounted on a respective mounting bar that is rotatably coupled to a respective arm. Furthermore, any and all example implementations can be realised in which a thrust vectoring module comprises at least one arm having one or more than one rotatably coupled mounting bar with each mounting bar bearing one or more than one thrust producing means. Therefore, example implementations can be realised in which a thrust vectoring module comprises a plurality of mounting bars each bearing one or more thrust producing means where each bar, or at least one or more than one bar, is rotatably coupled to a respective arm. Still further, example implementations can be realised that comprise a plurality of arms with each arm bearing one or more than one rotatably coupled mounting bar where each mounting bar comprises one or more than one thrust producing means. Example implementations in which a thrust vectoring module comprises a plurality of mounting bars with respective one or more thrust producing modules can be arranged such that selected thrust producing means have counter-rotating rotors. For example, example implementations can be realised in which the thrust producing means of one or more than one mounting bar have counter rotating rotors. Additionally, and alternatively, example implementations can be realised in which the thrust producing means of one or more than one bar have counter rotating rotors compared to the thrust producing means of one or more than one other bar, wherein the bars can be supported by a common arm or respective arms.

It will be appreciated that the rotations about the arm axes and bar axes in any or all example implementations can be realised using at least one, two or all, of differential forces, differential moments or respective actuators taken jointly and severally in any and all permutations. Rotations realised using at least one of differential forces or differential moments can be augmented or replaced by rotations using respective actuators. In addition to the foregoing, the thrust and moments, or torque, can be generated by collective or pitch control of the rotors in addition to, or as an alternative to, generating forces and moments using at least one of differential forces, differential moments or actuators taken jointly and severally in any and all permutations.

Example implementations generally comprise a control system for a vehicle, a vehicle with such a control system, and methods for controlling a vehicle using such a control system.

Example implementations provide a vehicle generally comprising a thrust vectoring module, which, in turn, comprises a plurality of thrust producing means. The thrust vectoring module can be controlled to generate a wide range of forces and moments on the vehicle, substantially independently of the vehicle's orientation in space.

In an example implementation a fluid borne vehicle comprises a thrust vectoring module affixed to the vehicle, wherein the thrust vectoring module comprises a plurality of thrust producing means rotatable about an axis fixed to the vehicle.

In a further example implementation, a fluid borne vehicle comprises a thrust vectoring module affixed to the vehicle, wherein the thrust vectoring module comprises a plurality of thrust producing means rotatable about an axis fixed to the vehicle, wherein differing the thrust produced by the thrust producing means causes the plurality of thrust producing means to rotate about the axis fixed to the vehicle, thus vectoring the thrust of the thrust vectoring module.

In a still further example implementation, a fluid borne vehicle comprises a plurality of thrust vectoring modules affixed to the vehicle, wherein a thrust vectoring module comprises a plurality of thrust producing means rotatable about an axis fixed to the vehicle, wherein differing the thrust produced by the thrust producing means causes the plurality of thrust producing means to rotate about the axis fixed to the vehicle, thus vectoring the thrust of the thrust vectoring module.

In a yet further example implementation, a fluid borne vehicle comprises a thrust vectoring module affixed to the vehicle, wherein the thrust vectoring module comprises a plurality of thrust producing means rotatable about a first axis that is rotatable about a second axis fixed to the vehicle, wherein an actuator causes the plurality of thrust producing means to rotate about the first axis, and differing the thrust produced by the thrust producing means causes the plurality of thrust producing means to rotate about the second axis, thus vectoring the thrust of the thrust vectoring module.

Example implementations can be realised according to any of the following clauses:

Clause 1. A fluid-borne vehicle comprising a plurality of thrust vectoring modules, wherein each thrust vectoring module comprises a plurality of thrust producing means, wherein a first thrust producing means is rotatable about a first axis and the first axis is rotatable about a second axis, which is not substantially parallel to the first axis; and a second thrust producing means is rotatable about a third axis and the third axis is rotatable about the second axis, which is not substantially parallel to the third axis.

Clause 2. A fluid-borne vehicle as in clause 1, wherein the first axis is rotatable about the second axis by individually varying the thrust produced by a plurality of thrust producing means in order to produce a moment that causes the first axis to rotate about the second axis.

Clause 3. A fluid-borne vehicle as in clause 1, wherein the first axis is rotatable about the second axis by an actuator.

Clause 4. A fluid-borne vehicle comprising a thrust vectoring module, wherein each thrust vectoring module comprises a plurality of thrust producing means, wherein a first plurality of thrust producing means is rotatable about a first axis and the first axis is rotatable about a second axis, which is not substantially parallel to the first axis; and a second plurality of thrust producing means is rotatable about a third axis and the third axis is rotatable about the second axis, which is not substantially parallel to the third axis.

Clause 5. A fluid-borne vehicle as in clause 4, wherein the first axis is rotatable about the second axis by individually varying the thrust produced by a plurality of thrust producing means in order to produce a moment that causes the first axis to rotate about the second axis.

Clause 6. A fluid-borne vehicle as in clause 4, wherein the first axis is rotatable about the second axis by an actuator.

Clause 7. A fluid-borne vehicle as in any of the preceding clauses, wherein the first and third axes are in a fixed relation to each other.

Clause 8. A fluid-borne vehicle as in any of the preceding clauses, wherein the vehicle comprises an elongate body.

Clause 9. A fluid-borne vehicle as in any of the preceding clauses, wherein the vehicle is adapted to carry a sensor.

Clause 10. A fluid-borne vehicle as in any of the preceding clauses, wherein the vehicle is adapted to launch a projectile or fire a beam of directed energy.

Clause 11. A fluid-borne vehicle as in any of the preceding clauses, wherein the vehicle comprises a crawling device for attachment to surfaces.

Clause 12. A fluid-borne vehicle as in any of the preceding clauses, wherein in a first configuration of the vehicle, the exhaust from a thrust producing means of the first thrust vectoring module substantially impinges on a thrust producing means of the second thrust vectoring module when the vehicle body is in a certain orientation and the first thrust vectoring module is generating a certain net force and a certain net moment on the vehicle; in a second configuration of the vehicle, the exhaust from no thrust producing means of the first thrust vectoring module substantially impinges on any thrust producing means of the second thrust vectoring module when the vehicle body is substantially in the same orientation and the first thrust vectoring module is producing substantially the same net force and net moment on the vehicle; and the vehicle is adapted to avoid the first configuration in preference to the second.

The invention claimed is:

1. A fluid-borne vehicle, comprising:
a body; and
at least one thrust vectoring module comprising a set of thrust producers, the set of thrust producers comprising a plurality of thrust producers;
wherein:
a first thrust producer of the set of thrust producers, mounted on a first mounting bar having a first mounting bar axis, is rotatable about the first mounting bar axis and the first mounting bar axis is rotatable about an arm having an arm axis that is nonparallel to the first mounting bar axis,
a second thrust producer of the set of thrust producers, mounted on a second mounting bar having a second mounting bar axis, is rotatable about the second mounting bar axis, and the second mounting bar axis is rotatable about the arm, and the arm axis is nonparallel to the second mounting bar axis,
the mounting bar axes are collectively rotatable about the arm axis by at least one of differential thrust and differential torque from the set of thrust producers, and
the first thrust producer being one of a first pair of thrust producers mounted on the first mounting bar and the second thrust producer being one of a second pair of thrust producers mounted on the second mounting bar.

2. The vehicle of claim 1, wherein the first thrust producer is:
(a) mounted on the first mounting bar in a relatively lower inertia arrangement, and
(b) offset relative to the arm in a relatively higher inertia arrangement for rotation using differential thrust compared to the relatively lower inertia arrangement.

3. The vehicle of claim 2, wherein the first pair of thrust producers is mounted on the first mounting bar in the relatively lower inertia arrangement in axial alignment with the first mounting bar axis.

4. The vehicle of claim 1, wherein the first mounting bar axis is rotatable about the arm axis by said at least one of differential thrust and differential torque from the set of thrust producers.

5. The vehicle of claim 1, wherein the second mounting bar axis is rotatable about the arm axis by said at least one of differential thrust and differential torque from the set of thrust producers.

6. The vehicle of claim 1, further comprising at least one actuator arranged to rotate at least the first pair of thrust producers about the first mounting bar axis.

7. The vehicle of claim 6, wherein the at least one actuator arranged to rotate at least the first pair of thrust producers about the first mounting bar axis is operable to vary the orientation of respective axes of rotation of at least the first pair of thrust producers.

8. The vehicle of claim 1, wherein the first pair of thrust producers are distally disposed on the first mounting bar on either side of the arm axis.

9. The vehicle of claim 1, wherein the second pair of thrust producers are distally disposed on the second mounting bar on either side of the arm axis.

10. The vehicle of claim 1, wherein the at least one thrust vectoring module is freely rotatable about the arm axis.

11. The vehicle of claim 1, wherein the body is an elongate body having a longitudinal axis wherein at least one of the first mounting bar axis or the second mounting bar axis is parallel to the longitudinal axis, and the arm axis is orthogonal to the longitudinal axis.

12. The vehicle of claim 1, further comprising at least two thrust vectoring modules disposed at respective ends of the body.

13. The vehicle of claim 12, further comprising at least four thrust vectoring modules with at least two pairs of the thrust vectoring modules being disposed at respective ends of the body.

14. The vehicle of claim 1, further comprising a controller to control at least one of a thrust or orientation of one or more than one of: the first and second pairs of thrust producers, said at least one thrust vectoring module, or both.

15. The vehicle of claim 14, wherein the controller is arranged to orientate a thrust producer relative to a further thrust producer to reduce an influence of thrust from said thrust producer on said further thrust producer.

16. The fluid-borne vehicle of claim 1, wherein the first mounting bar axis is rotatable about the arm axis by individually varying the thrusts produced by thrust producers of the first pair of thrust producers to produce a moment that causes the first mounting bar axis to rotate about the arm axis.

17. The vehicle of claim 1, wherein the first mounting bar axis and the second mounting bar axis are in a fixed relation to each other.

18. The vehicle of claim 1, wherein the vehicle is adapted to carry a sensor.

19. The vehicle of claim 1, wherein the vehicle is adapted to launch a projectile or fire a beam of directed energy.

20. The fluid-borne vehicle as in claim 1, wherein said at least one thrust vectoring module comprises a first thrust vectoring module and a second thrust vectoring module, wherein in a first configuration of the vehicle, exhaust from a thrust producer of the first thrust vectoring module substantially impinges on a thrust producer of the second thrust vectoring module when the vehicle body is in a certain orientation and the first thrust vectoring module is generating a certain net force and a certain net moment on the vehicle; in a second configuration of the vehicle, the exhaust from no thrust producer of the first thrust vectoring module substantially impinges on any thrust producer of the second thrust vectoring module when the vehicle body is substantially in the same orientation and the first thrust vectoring module is producing substantially the same net force and net moment on the vehicle; and the vehicle is adapted to avoid the first configuration in preference to the second configuration.

21. The vehicle of claim 1, wherein each thrust producer has a respective axis of rotation that intersects an axis of a respective mounting bar.

22. The vehicle of claim 1, wherein the second pair of thrust producers is:
  (a) mounted on the second mounting bar in a relatively lower inertia arrangement, and
  (b) offset relative to the arm axis in a relatively higher inertia arrangement for rotation using differential thrust compared to the relatively lower inertia arrangement.

23. The vehicle of claim 22, wherein the second pair of thrust producers is mounted on the second mounting bar in the relatively lower inertia arrangement in axial alignment with the second mounting bar axis.

* * * * *